United States Patent [19]

Collins

[11] Patent Number: 5,795,115
[45] Date of Patent: Aug. 18, 1998

[54] APPARATUS FOR ON-LOADING AND/OR OFF-LOADING A VEHICLE ON A VEHICLE CARRIER AND RELEASEABLY LATCHING THE VEHICLE THERETO

[76] Inventor: Joe H. Collins, 87749 Collins La., Springfield, Oreg. 97478

[21] Appl. No.: 482,975

[22] Filed: Jun. 6, 1995

[51] Int. Cl.⁶ .................................................. B60P 7/08
[52] U.S. Cl. ........................ 410/22; 410/7; 410/19; 410/77; 414/485
[58] Field of Search .............................. 410/4, 7, 9, 19, 410/22, 48, 67, 77; 414/482, 483, 484, 485, 563; 280/402

[56] References Cited

U.S. PATENT DOCUMENTS

| | | | |
|---|---|---|---|
| 1,426,164 | 8/1922 | Evans | 410/22 |
| 1,443,913 | 1/1923 | Ellis | 410/4 X |
| 1,751,788 | 3/1930 | Borowka | 410/10 |
| 1,824,634 | 9/1931 | Snyder | 410/22 X |
| 2,313,335 | 3/1943 | Godfrey | 410/19 X |
| 2,860,800 | 11/1958 | Wilson et al. | |
| 3,035,728 | 5/1962 | Hecker | 414/484 X |
| 3,857,504 | 12/1974 | Bausenbach et al. | 410/77 X |
| 4,475,762 | 10/1984 | DeLong | 410/19 X |
| 4,968,210 | 11/1990 | Friederich | 414/485 |
| 5,051,053 | 9/1991 | Groeneweg | 414/483 |
| 5,387,070 | 2/1995 | Roeling | 414/485 X |

FOREIGN PATENT DOCUMENTS

| | | | |
|---|---|---|---|
| 1242131 | 8/1960 | France | 410/4 |

*Primary Examiner*—Stephen T. Gordon
*Attorney, Agent, or Firm*—J. Robert Cassidy

[57] ABSTRACT

A system for latching a vehicle to a flatbed carrier including: at least one latch assembly mounted on the carrier outboard of respective ones of at least one of the vehicle's wheels; each latch assembly including a box-like bracket having longitudinally extending, vertically spaced, co-planar flanges defining a longitudinally extending vertical gap, at least one plate-like safety latch mounted for movement about a vertical pivot axis towards and away from the flanges, a biasing mechanism for urging each safety latch about its pivot axis towards the co-planar flanges, and a fixed stop mounted adjacent the forward end of the gap, a wheel latch flange mounted on each vehicle wheel disposed inboard of each latch assembly when the vehicle is loaded on the carrier; each wheel latch flange including a laterally extending stub shaft having an enlarged protuberance on its outboard end with a diameter greater than the height of the gap and an inboard portion with a diameter less than the height of the gap, whereupon when the vehicle is loaded on the carrier, each wheel latch flange is received within respective ones of each latch assembly with the co-planar flanges being disposed inboard of the protuberance so that the stub shaft shifts the safety latch laterally against the biasing force during vehicle on-loading with the safety latch shifting back into its biased latch-engaged position when the vehicle is loaded to latch the vehicle to the carrier.

12 Claims, 12 Drawing Sheets

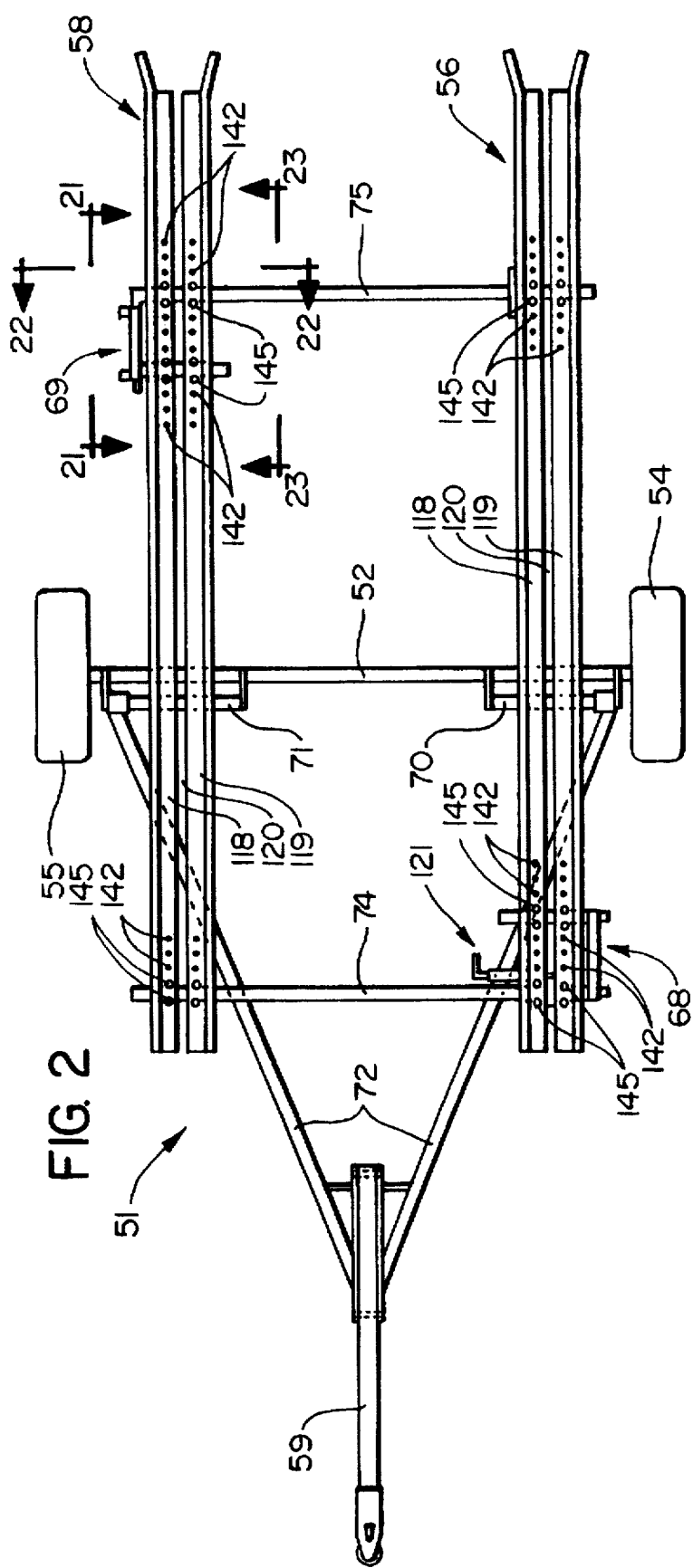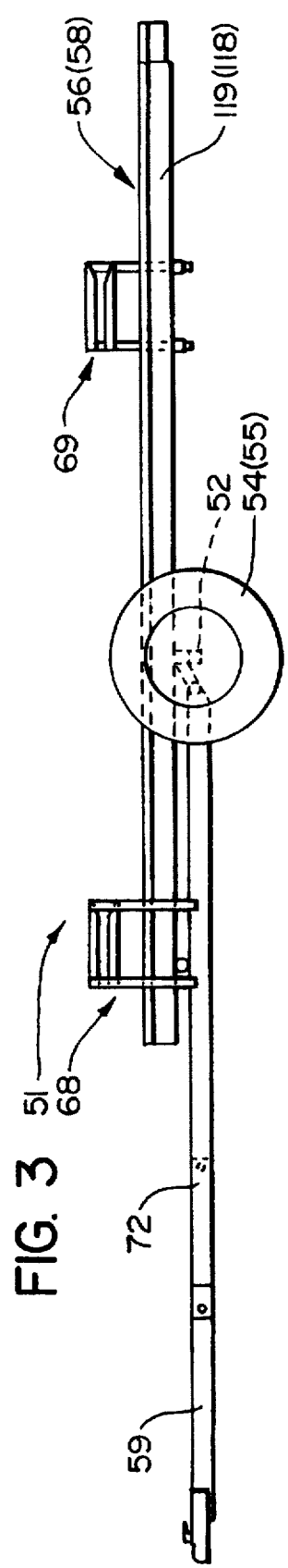

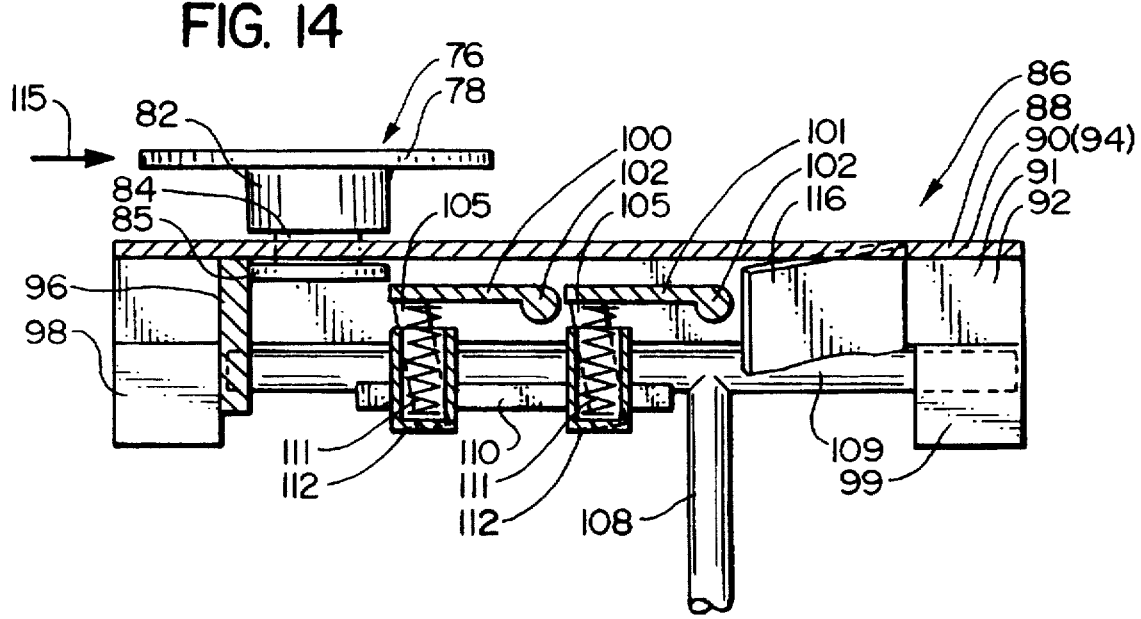
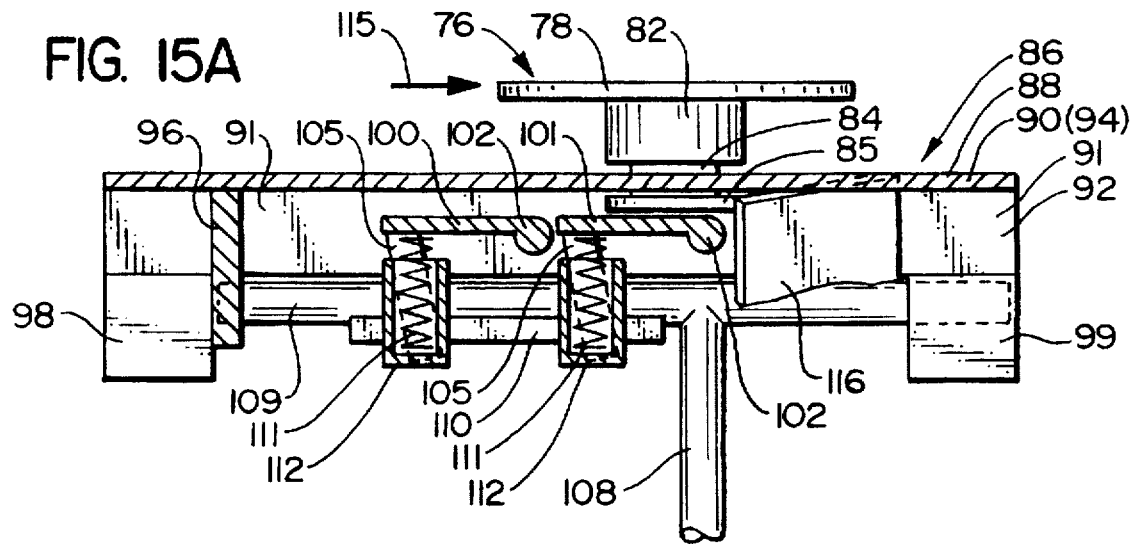
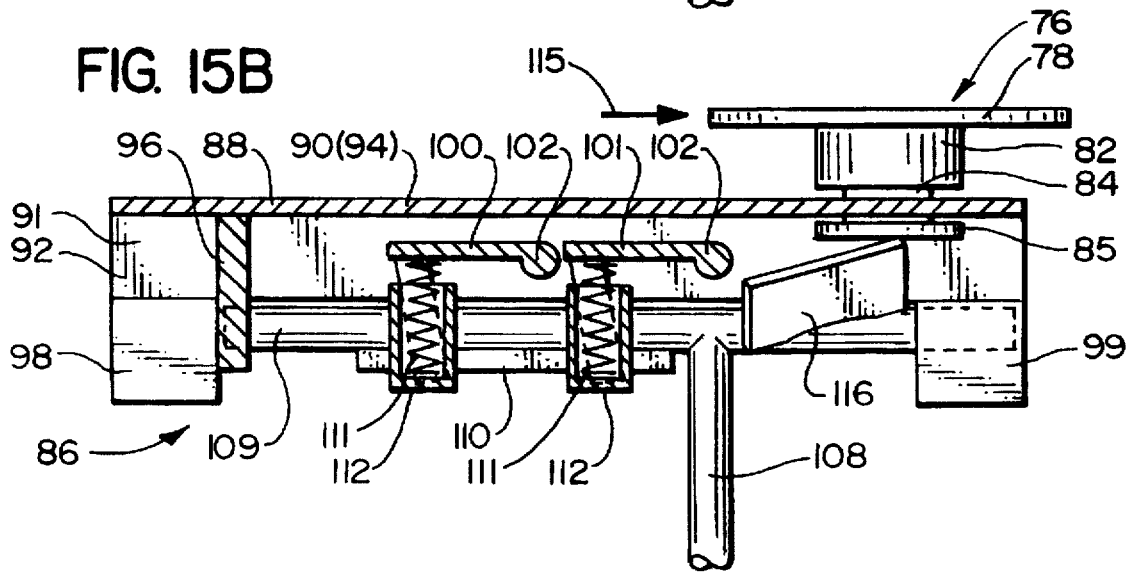

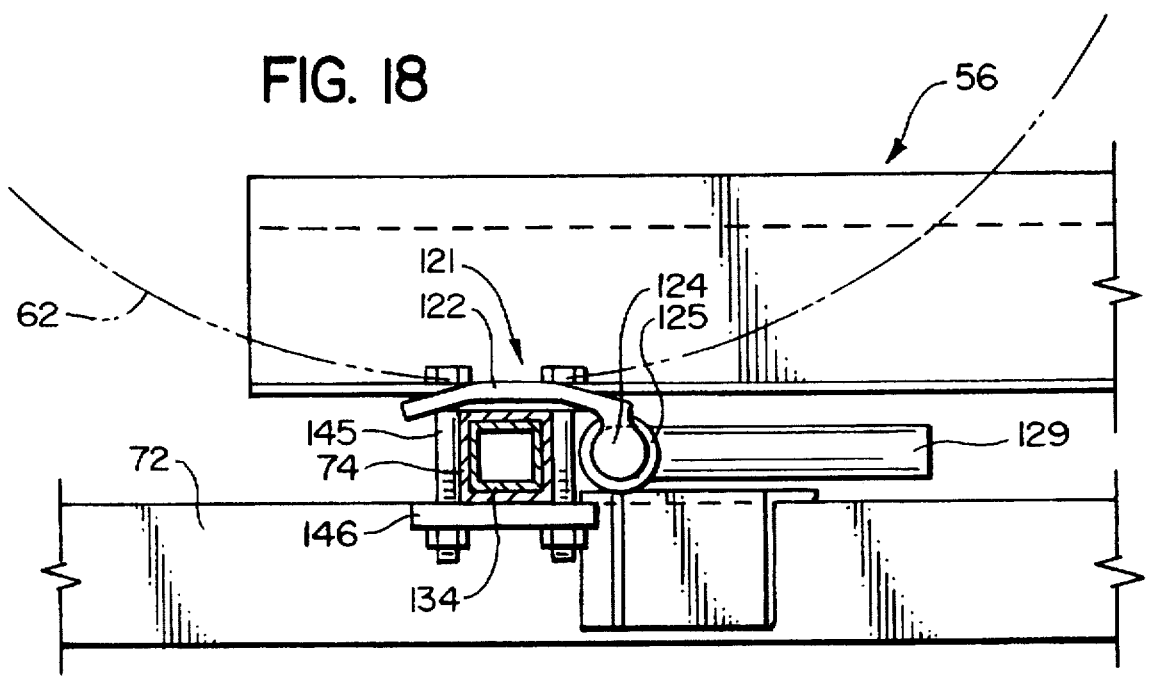
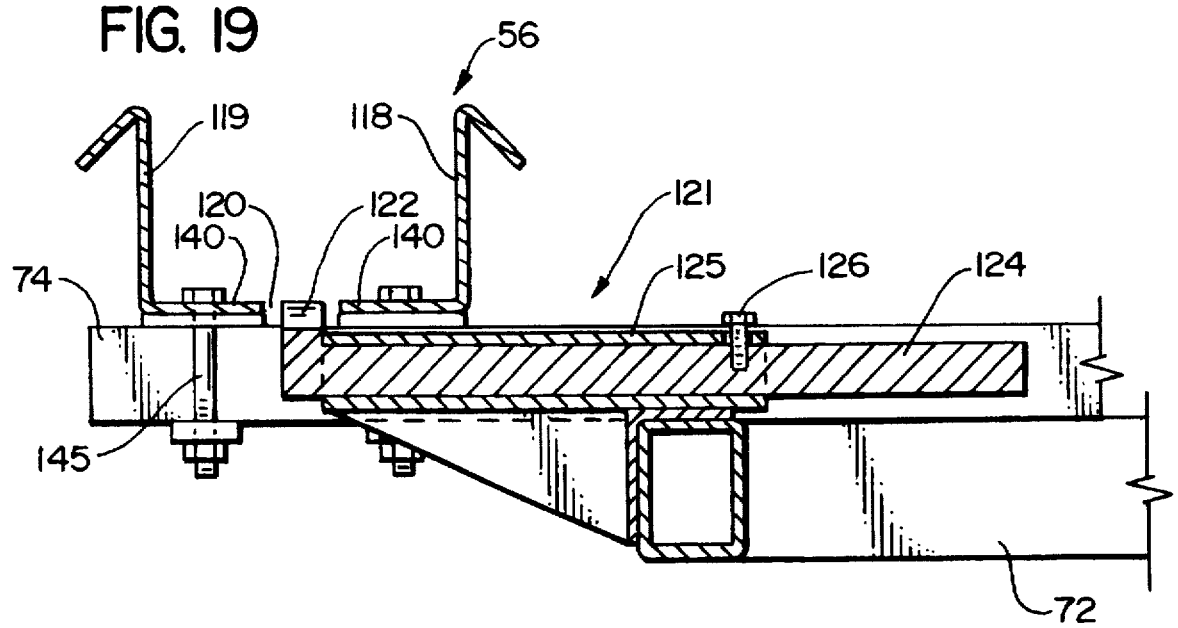

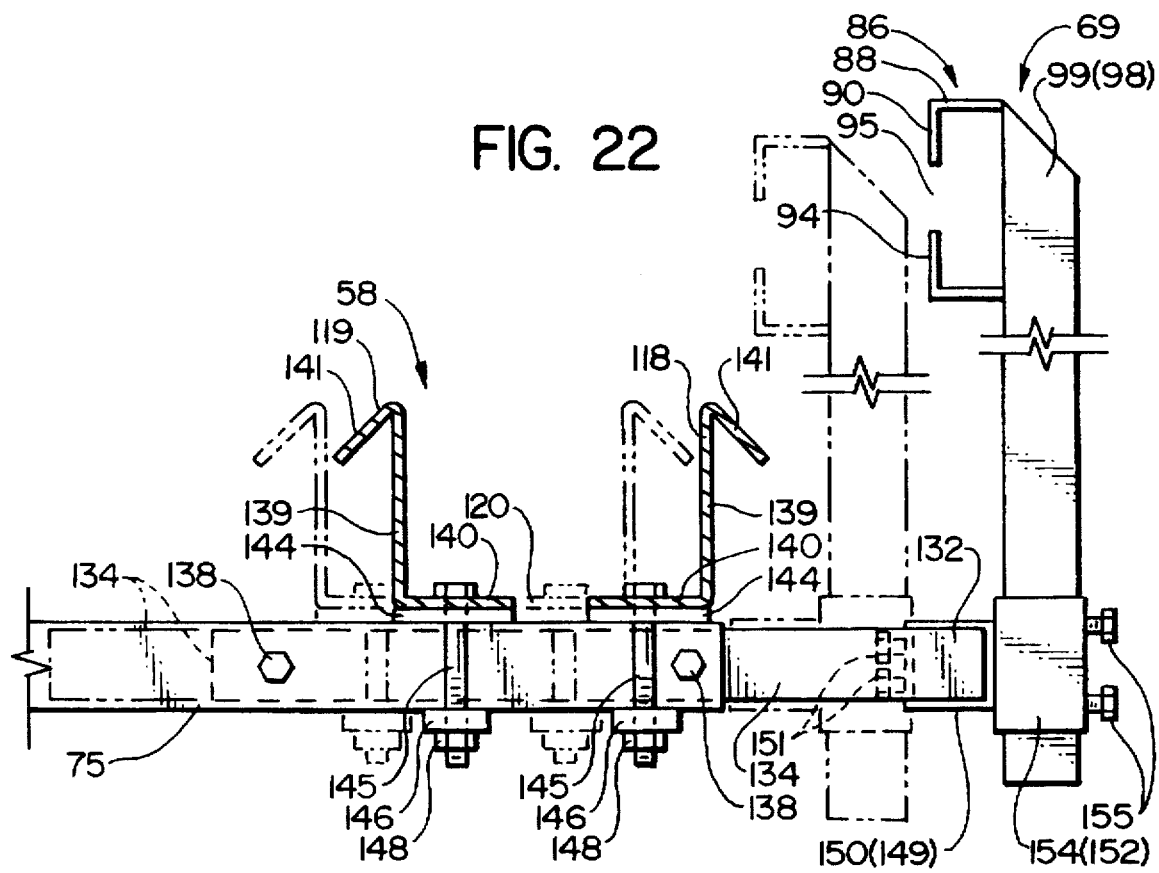
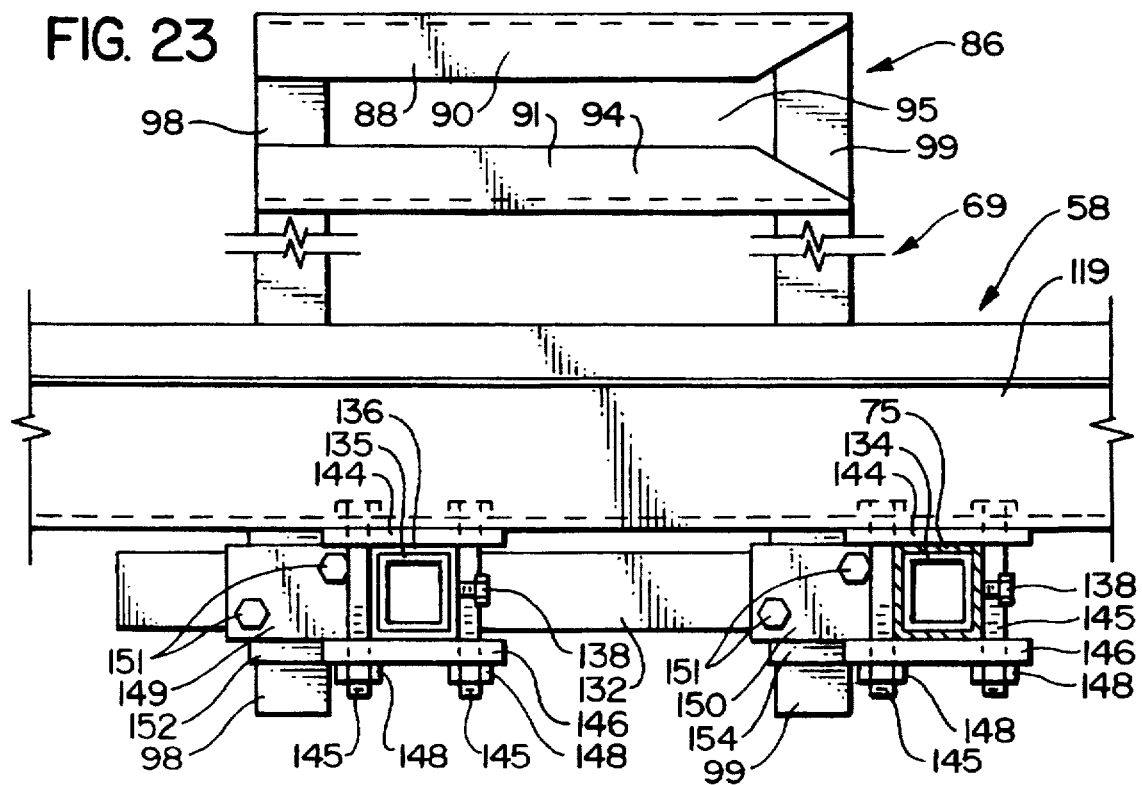

APPARATUS FOR ON-LOADING AND/OR OFF-LOADING A VEHICLE ON A VEHICLE CARRIER AND RELEASEABLY LATCHING THE VEHICLE THERETO

BACKGROUND OF THE INVENTION

1. Technical Field

The present invention relates generally to vehicle carriers; and, more particularly, to apparatus and methods for automatically, yet releaseably, latching a vehicle to the carrier as the vehicle is driven or otherwise loaded onto the carrier during an on-loading operation. In one of its more detailed aspects, and as illustrated in the exemplary form of the invention shown in the drawings, the vehicle carrier can be of the type that is tiltable between: i) a first inclined and ground-engaged position for permitting on-loading and/or off-loading of a vehicle; and ii), a second horizontal position for transporting a vehicle from one point to another—yet, wherein when the vehicle is on-loaded on the vehicle carrier, it is automatically, yet releaseably, latched to the vehicle carrier without the need for operator intervention.

In the illustrative form of the invention depicted by way of example in the drawings and hereinafter described in greater detail, the exemplary "vehicle carrier" comprises a towable vehicle trailer of the type adapted to be coupled to any suitable tow vehicle such, for example, as a pick-up truck or the like. However, as the ensuing description proceeds, it will become apparent to persons skilled in the art that the particular "vehicle carrier" employed may take a wide range of other forms including, but not limited to, barges, boats, flatbed railroad cars, cargo aircraft, and like carriers, provided only that the particular vehicle carrier employed incorporates the methods and apparatus hereinafter described for automatically, yet releaseably, latching a vehicle to be transported to the particular vehicle carrier employed.

More specifically, the present invention contemplates the usage of at least one, and preferably two or more, wheel latch flange(s) which is(are) mounted on at least one, and preferably two or more, of the wheels of the vehicle to be transported—for example, a wheel latch flange may, as shown in the exemplary embodiment of the invention herein depicted and described, be mounted on each of the left front and right rear wheels of the vehicle—which wheel lock flanges are inter-engageable with corresponding respective ones of a pair of left front and right rear upstanding latch assemblies fixedly, yet adjustably, secured to the left front and right rear of the vehicle carrier's frame so that as the vehicle is loaded onto the carrier, the wheel latch flanges on the left front and right rear wheels of the vehicle: i) enter into latchable engagement with respective ones of the left front and right rear latch assemblies; and ii), shift spring biased safety latches in the two latch assemblies out of the path of the wheel latch flanges as the wheel latch flanges engage the safety latches just prior to the point when the vehicle is fully loaded in its forward-most position on the carrier. As a consequence, when the wheel latch flanges pass over the spring biased safety latches and the vehicle reaches its forwardmost position on the vehicle carrier, the spring biased safety latches snap into the permissible fore/aft path of movement of the wheel latch flanges, thereby fixedly, yet releaseably, latching the vehicle to the carrier's frame until such time as the spring biased safety latches are again shifted out of the fore/aft path of movement of the wheel latch flanges by any suitable manual, mechanical, electrical, hydraulic, pneumatic or other suitable latch releasing mechanism.

In carrying out this aspect of the invention, the tiltable wheel ramps on the exemplary vehicle carrier are preferably positioned with reference to the carrier's axle such that as the vehicle's center-of-gravity passes over the carrier's axle during a vehicle on-loading operation, the wheel ramps pivot from the tilted ground-engaged position to a horizontal vehicle transport position, with the vehicle's front wheels being received on a ramp holddown mechanism at the front end of the trailer when the vehicle is fully loaded thereon so as to lock the tiltable wheel ramps to the carrier frame in the horizontal vehicle transport position and prevent tilting of the wheel ramps until such time as the safety latch(s) is(are) released and the vehicle is backed rearwardly off the carrier with its center-of-gravity passing rearwardly over the carrier's axle, at which point the wheel ramps on the carrier again pivot into a tilted ground-engaged position.

The methods and apparatus of the present invention readily permit of adjustment of the front and rear latch assemblies with respect to the carrier frame so as to accommodate vehicles having a wide range of differing wheel sizes and/or wheelbase lengths and/or widths. Of course, as the ensuing description proceeds, those skilled in the art will appreciate that there need not be two latch assemblies positioned to inter-engage with wheel latch flanges mounted on the left front and right rear wheels of the vehicle, but, rather, a single latch assembly and wheel latch flange can be associated with any one of the vehicle's wheels or, alternatively, wheel latch flanges and latch assemblies can be associated with the two front wheels, the two rear wheels, the right front and left rear wheels, the two right wheels, the two left wheels or, if desired, with any three or all four wheels. However, excellent results have been observed in terms of stability and reliability when two wheel latch flanges are employed on diametrically opposed ones of the vehicle's wheels—e.g., the left front and right rear wheels as depicted in the exemplary and illustrative embodiment of the invention or, alternatively, the right front and left rear wheels—with the two diametrically opposed wheel latch flanges being inter-engagable with correspondingly positioned latch assemblies fixedly, yet adjustably, mounted on the vehicle carrier's frame.

2. Background Art

Those skilled in the art will, of course, appreciate that a wide range of different types of vehicle carriers are currently, and have for a number of years been, in use. Typically, where such a vehicle carrier comprises, for example, a towable vehicle trailer, the trailer will commonly include a tiltable vehicle bed which can be shifted between a horizontal vehicle transport position and a tilted ground-engaged position for on-loading and/or off-loading vehicles. In some instances the vehicle can be driven onto the tilted vehicle bed with the bed then being mechanically, hydraulically, pneumatically or electrically shifted to the horizontal position; while, in other instances the vehicle tow truck will include a manually, electrically, hydraulically or pneumatically operable winch assembly for pulling the vehicle onto the tilted trailer bed or for permitting the vehicle to be off-loaded by paying-out the tow cable. In either case, however, the vehicle is generally restrained in place on the vehicle carrier's bed by means of chains or similar tether members which must be manually attached and/or removed each time that the vehicle is on-loaded or off-loaded. Similar restraints are also generally employed where the vehicle carrier comprises a barge, boat, flatbed railroad car, cargo plane, or the like.

Numerous of the known conventional trailering systems have been described in the patent art. For example, a typical and conventional vehicle transport system is disclosed in U.S. Pat. No. 5,051,053 issued to Ronald L. Groeneweg. As here shown, the patent contemplates usage of a vehicle trailer having a fixed, stationary, peripheral frame and a centrally located tiltable vehicle bed onto which the vehicle to be transported can be driven, winched or pushed. No provision is made for latching the vehicle to the trailer or to the tiltable bed.

Wilson et al U.S. Pat. No. 2,860,800 is of interest for its disclosure of a trailer intended to accommodate and transport small self-propelled vehicles such as road striping machines. The apparatus includes a trailer frame, a pair of pivoted channel-shaped trackways, and a pair of guide ramps. The channel-shaped trackways and guide ramps are pivoted down to a ground-engaged position for off-loading and/or on-loading purposes; and, during a loading operation the vehicle is driven up the guide ramps onto the trackways, over-balancing the latter and pivoting the trackways to a horizontal position. The vehicle is restrained on the trailer by fixed stops engaging the front edges of the vehicle's tires, while the guide ramps are shifted into positive locking engagement with the rear edges of the vehicle's tires. A manually operated latch mechanisms is provided for latching the trackways to the trailer frame during vehicle transport.

U.S. Pat. No. 4,475,762 issued to U.S. Seating Co., Inc. as the assignee of Arthur DeLong et al., is of interest for its disclosure of a mechanism for securing a wheelchair to a moveable platform. In this apparatus, the wheelchair restraint system includes a spring-biased locking pin which passes laterally through the spokes of the wheelchair.

Borowka U.S. Pat. No. 1,751,788 and Evans U.S. Pat. No. 1,426,164 are of interest for their disclosures of mechanisms for securing a vehicle being transported to the deck of the vehicle carrier such, for example, as a flatbed railroad car. In Borowka, adjustable chocks are provided with a latching mechanism including chains secured to the wheel hubs; while Evans utilizes an assemblage of timbers to restrain the vehicle's axle.

In U.S. Pat. No. 2,313,335 issued to Louis Marx & Company, Inc. as the assignee of Donald V. Godfrey, there is disclosed a toy railway system including a pivoted latching member which is adapted to engage a toy vehicle's axle for latching the toy to a flatbed carrier.

Unfortunately, however, the known conventional systems such, for example, as those disclosed in the foregoing patents, are generally relatively complex and either devoid of any practical mechanism for affirmatively latching the transported vehicle to the vehicle carrier or, alternatively, they rely upon operator intervention to secure chains, cables or like tethers to the transported vehicle to prevent movement thereof.

SUMMARY OF THE INVENTION

The present invention provides methods and apparatus which overcome all of the foregoing disadvantages inherent in conventional known vehicle trailering systems by providing a system wherein the tiltable trailer bed or ramps, or other vehicle carrier mechanism(s), is(are) provided with at least one, and preferably two or more, upstanding, fixed, yet adjustable, latch assemblies, each employing at least one deflectable safety latch and, preferably, two or more deflectable safety latches for purposes of redundant safety; and, wherein at least one, and preferably two or more, of the wheels of the vehicle to be transported is(are) provided with a wheel latch flange fixedly, yet removably, secured to the wheel lugs by lug nuts and positioned such that when the vehicle is on-loaded onto the vehicle carrier, the wheel latch flange on, for example, the left front wheel, enters into an upstanding latch assembly adjustably secured to the vehicle carrier's frame adjacent the left front end of the carrier. Where a second wheel latch flange is mounted on, for example, the right rear wheel, a second upstanding latch assembly is fixedly, yet adjustably, mounted on the vehicle carrier frame, and positioned such that as the left front wheel latch flange enters into the left front latch assembly, the right rear wheel latch flange enters into the right rear latch assembly. Those skilled in the art will appreciate as the ensuing description proceeds that in the exemplary form of the invention hereinbelow described, the left front and right rear latch assemblies are engaged substantially simultaneously; but, in its broader aspects, it is immaterial as to whether multiple latch assemblies, where employed, are engaged simultaneously or sequentially.

In an on-loading operation, as the vehicle is moved ahead on the vehicle carrier into its fully loaded position, the wheel latch flange(s): i) engage the deflectable safety latches associated with each upstanding latch assembly; and ii), shift the deflectable safety latches out of the path of forward movement of the wheel latch flanges. When the wheel latch flanges pass forward over and past the deflectable safety latches, the latter are then biased back into their original non-deflected positions where they prevent rearward movement of the wheel latch flanges and, therefore, the vehicle, until such time as the deflectable safety latches are again deflected out of the path of rearward movement of the wheel latch flanges.

In the illustrative embodiment of the invention, the deflectable safety latches are spring-biased in an inward lateral direction—i.e., towards the vehicle carrier's longitudinal centerline—so that as the wheel latch flanges engage the deflectable safety latches during an on-loading operation when the vehicle is moving forward on the carrier, the wheel latch flanges deflect the safety latches laterally outward against the spring bias, permitting the deflected safety latches to automatically snap back into latching relationship with the wheel latch flanges immediately after the latter pass over the deflected safety latches.

Of course, those skilled in the art will appreciate as the ensuing description proceeds that the deflectable safety latches can be arranged to be biased by springs or other biasing mechanisms in any desired direction—i.e., inwardly as shown, outwardly, upwardly or downwardly—provided only that passage of the wheel latch flanges serves to momentarily shift the deflectable safety latches out of the path of forward movement of the wheel latch flanges as the latter move past the deflectable safety latches, with the particular biasing mechanism employed—e.g., spring, hydraulic, pneumatic, etc.—then serving to snap or force the deflected safety latches into their original non-deflected position in the path of rearward movement of the wheel latch flanges which are fixedly secured to the vehicle's wheels.

Thus, the arrangement is such that upon entry of the wheel latch flanges into the upstanding latch assemblies, the vehicle is restrained from both lateral and/or vertical movement relative to the vehicle carrier; but, it remains free to move in a forward direction relative to the carrier towards a fixed stop. As soon as the wheel latch flanges traverse the deflectable safety latches, the latter automatically snap back into their original non-deflected state, securing the vehicle between the fixed stop and the deflectable safety latches, thus inhibiting fore/aft movement of the vehicle relative to the vehicle carrier. Moreover, all of the foregoing is achieved without any need for operator intervention.

When the operator is ready to off-load the vehicle being transported, it is merely necessary to shift the biased deflectable safety latches out of the path of rearward movement of the wheel latch flanges; and, in the illustrative embodiment of the invention, this is accomplished by merely rotating a latch actuating handle through an angle of approximately 90°, camming the deflectable safety latches against the biasing forces and out of the path of rearward movement of the wheel latch flanges; and, at the same time, rotating a camshaft coupled to the actuating handle through an angle of approximately 90° to position a ramp-like cam in the path of movement of the wheel latch flanges aft of the deflectable safety latches. Thus, as the vehicle is backed off the vehicle carrier, the wheel latch flanges move rearwardly in the upstanding latch assemblies past the deflected safety latches. When the wheel latch flanges engage the ramp-like cam on the camshaft, they cause the camshaft to be rotated in the opposite direction, freeing the deflected safety latches and permitting the biasing force to snap the deflectable safety latches back into their original non-deflected fully latched state.

It is a general objective of the present invention to provide a simple, yet highly effective, latch assembly for insuring that vehicles to be transported are affirmatively and positively latched in position on the carrier by the simple expedient of moving the vehicle into a fully loaded position on the vehicle carrier, thus causing a wheel latch flange on at least one of the vehicle's wheels to first deflect, and then be positively captured by, deflectable safety latches that are biased into a position where they operatively engage and latch at least one of the vehicle's wheels in a fixed immovable position on the vehicle carrier. Because each latch assembly used employs a pair of tandem, spring-biased, deflectable safety latches, redundant safety precautions are insured. That is, even if one safety latch should fail, there is still a second independent spring-biased safety latch in each upstanding latch assembly. As a consequence, where two wheel latch flanges are employed for co-action with two separate upstanding latch assemblies on the vehicle carrier, there are a total of four safety latches provided, all of which must either be deliberately released or fail before the vehicle is free to move rearward relative to the carrier.

In one of its more detailed aspects, it is an object of the invention to provide an improved latch mechanism for positively latching a vehicle to a vehicle carrier wherein the latch mechanism employs at least one, and preferably multiple, upstanding latch assemblies securely affixed to the vehicle carrier's frame with each latch assembly positioned to be latchably engaged with a wheel latch flange mounted on one of the vehicle carrier's wheels; yet, wherein each latch assembly may be shifted laterally either inboard or outboard, or shifted vertically, or shifted in either a fore/aft direction, all relative to the vehicle carrier's frame, and then rigidly attached to the vehicle carrier's frame in a desired position so as to enable the latching system to readily accommodate vehicles having different size wheels and/or having different length and/or width wheelbases.

Another of the more detailed objectives of the present invention is the provision of a simple, yet reliable, holddown mechanism for a tiltable vehicle carrier bed and/or ramps wherein the fully loaded vehicle to be transported serves to actuate the holddown mechanism, thereby preventing tilting of the trailer bed or ramps until such time as the fully loaded vehicle is moved rearwardly so as to disable the holddown mechanism.

DESCRIPTION OF THE DRAWINGS

These and other objects and advantages of the present invention will become more readily apparent upon reading the following Detailed Description and upon reference to the attached drawings, in which:

FIG. 2 is a plan view of the exemplary trailer shown in FIG. 1 embodying features of the present invention;

FIG. 3 is a side elevational view of the exemplary trailer depicted in FIGS. 1 and 2, here depicting the trailer in its non-tilted or horizontal vehicle-carrying position, but without a vehicle mounted thereon;

FIG. 14 is a horizontal sectional view similar to FIGS. 9 and 11, but here illustrating the latch assembly in the unlatched state wherein the wheels of the vehicle to be transported are free to move rearwardly during unloading of the transported vehicle;

FIGS. 15A and 15B are stop motion views similar to FIG. 14, but here illustrating the relationship of the vehicle wheel and its attached wheel latch flange to the latch assembly at two spaced points in time—viz., i) at that point in time when the wheel latch flange has cleared the safety latches and has first engaged the latch reset ramp on the camshaft (FIG. 15A); and ii), at the point in time when the wheel latch flange has cammed the latch reset ramp outwardly so as to automatically reset the latch assembly to the latched state (FIG. 15B);

FIG. 18 is a fragmentary, longitudinal, side elevational view, partly in section and taken substantially along the line 18—18 in FIG. 17, here illustrating details of the trailer holddown mechanism;

FIG. 19 is a transverse vertical sectional view taken substantially along the line 19—19 in FIG. 17 and illustrating other details of the vehicle carrier holddown mechanism;

FIG. 22 is a fragmentary, transverse, vertical sectional view taken substantially along the line 22—22 in FIG. 2, here depicting an exemplary mechanism for permitting adjustment of the latch assembly in a lateral direction between the solid line position shown and the phantom line position shown to accommodate vehicles having different widths and, therefore, whose wheels on a common axle are either closer together or further apart, and illustrating also the permissible adjustment of the latch assembly in an up and down direction as reflected by the phantom lines and solid lines, respectively, to accommodate vehicles having different sized tires;

FIG. 23 is a fragmentary side elevational view, partly in section and taken substantially along the line 23—23 in FIG. 2, here depicting an arrangement for permitting fore and aft adjustment of either or both of the rear cross support and/or front cross support to accommodate vehicles having differing wheelbases in terms of lengths; and, FIG. 24 is a fragmentary plan view on an enlarged scale, here depicting the overall construction of the assemblage of the rear portion of the right C-shaped track rails to the rear cross support and the right rear latch assembly, together with depiction of structural details permitting of: i) widening or narrowing of the C-shaped track; ii) shifting of the C-shaped track and the rear cross support in either a forward or rearward direction to accommodate vehicles having shorter or longer wheelbases; iii) shifting of the C-shaped track inward or outward to accommodate vehicles having narrower or wider wheelbases; and iv), shifting of the right rear latch assembly in, out, up and/or down to permit registration thereof with the wheel latch flange on the right rear wheel of the vehicle.

Figure 1:
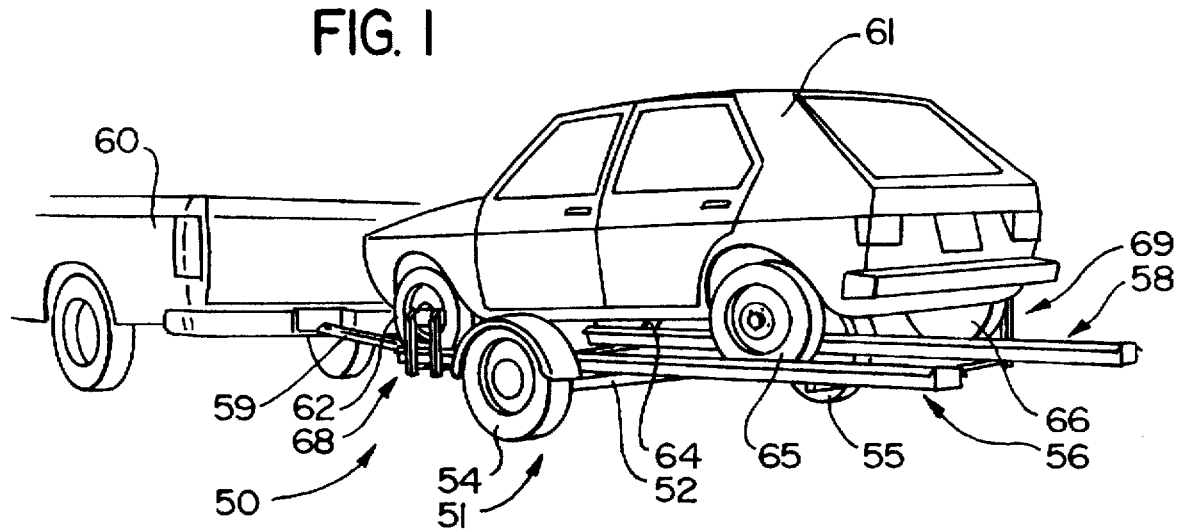
FIG. 1 is a fragmentary isometric view here illustrating the rear end of a towing vehicle coupled to an exemplary trailer embodying automatic vehicle latching features in accordance with the present invention and supporting thereon a vehicle to be transported.

While the invention is susceptible of various modifications and alternative forms, specific embodiments thereof have been shown by way of example in the drawings and will herein be described in detail. It should be understood, however, that it is not intended to limit the invention to the particular forms disclosed; but, on the contrary, the intention is to cover all modifications, equivalents and/or alternatives falling within the spirit and scope of the invention as expressed in the appended claims.

DETAILED DESCRIPTION

Turning now to the drawings, and directing attention first to FIG. 1, it will be noted that a vehicle carrier system, generally indicated at 50, has been illustrated which here includes a trailer, generally indicated at 51, having a single axle 52, left and right wheels 54, 55, a pair of left and right channel-shaped tracks or ramps, generally indicated at 56, 58, and a tow bar 59 of generally conventional construction for hitching the trailer 51 to a suitable tow vehicle such, for example, as a pick-up truck of the type illustrated fragmentarily at 60. As will be apparent upon inspection of FIG. 1, the exemplary vehicle carrier system 50 is here shown as transporting a conventional 4-wheeled automobile 61 having left and right front wheels 62, 64 and left and right rear wheels 65, 66, with the left front and rear wheels 62,65 supported on the left C-shaped track 56 and the right front and rear wheels 64, 66 supported on the right C-shaped track 58. As the ensuing description proceeds, it will become apparent that during transportation, the vehicle 61 is fixedly, yet releaseably, secured to the trailer 51 by left front and right rear latch assemblies, generally indicated at 68, 69, which are made and operate in accordance with the present invention as hereinafter described in greater detail in conjunction with FIGS. 4, 5 and 8 through 16.

Referring next to FIGS. 2, 3, 6 and 7 conjointly, details of the exemplary trailer 51 will be described in somewhat greater detail. However, as the ensuing description proceeds, it is to be understood that while the illustrative and purely exemplary vehicle carrying system 50 (FIG. 1) has herein been depicted in conjunction with a generally conventional tiltable towable vehicle trailer 51 and finds particularly advantageous use with such a trailer, in its broadest aspects the invention can be used with a wide range of other conventional vehicle carrier systems (not shown) which may or may not include tiltable ground-engageable ramps for on-loading and/or off-loading the vehicle to be transported. For example, the latch assemblies 68, 69 of the present invention will also find equally advantageous use with barges, boats, flatbed railroad cars or the like, cargo aircraft, and similar conventional cargo carriers.

In the illustrative apparatus here shown, the vehicle trailer 51 includes a frame comprising the vehicle axle 52, left and right support structures 70, 71 at the outboard ends of the axle 52, and a V-shaped frame member 72 having the fowardly projecting tow bar 59 welded, bolted or otherwise permanently affixed to the apical end of the V-shaped frame member 72. The left and right C-shaped tracks 56, 58 are preferably fixedly, yet adjustably, mounted on a front cross support 74 and a rear cross support 75 with freedom for adjustment in both the fore/aft and inboard/outboard (e.g., left/right) directions, so as to enable the left and right tracks 56, 58 to be adjusted to accommodate vehicles (such as the automobile 61 depicted in FIGS. 1 and 7) having various and differing wheelbases in terms of both width and overall length. The specific details relating to the mounting of the C-shaped tracks 56, 58 on the front and rear cross supports 74, 75 with freedom for fore/aft, side-to-side, and width adjustments, together with the adjustable mountings for the left and right latch assemblies 68, 69, will be described in greater detail in connection with FIGS. 21 through 24. Preferably, however, the left and right C-shaped tracks, 56, 58 are pivotally mounted on the axle 52 so as to enable the trailer 51 to be disposed in a horizontal vehicle transporting position as shown in FIGS. 1 through 3, or in a tilted or inclined position wherein the rear ends of the tracks 56, 58 engage the ground as shown in FIGS. 6 and 7 with the tracks 56, 58 functioning as ramps to permit on-loading and/or off-loading of the vehicle 61.

Figure 6:
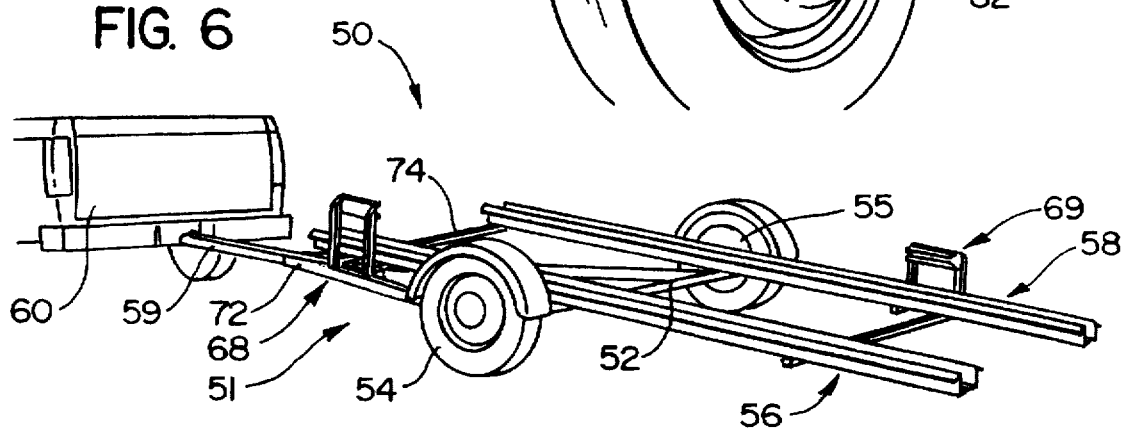
FIG. 6 is a fragmentary isometric view somewhat similar to FIG. 1, but here depicting the exemplary trailer with its wheel ramps in the tilted ground-engaged position in readiness for loading of a vehicle to be transported thereon.
Figure 7:
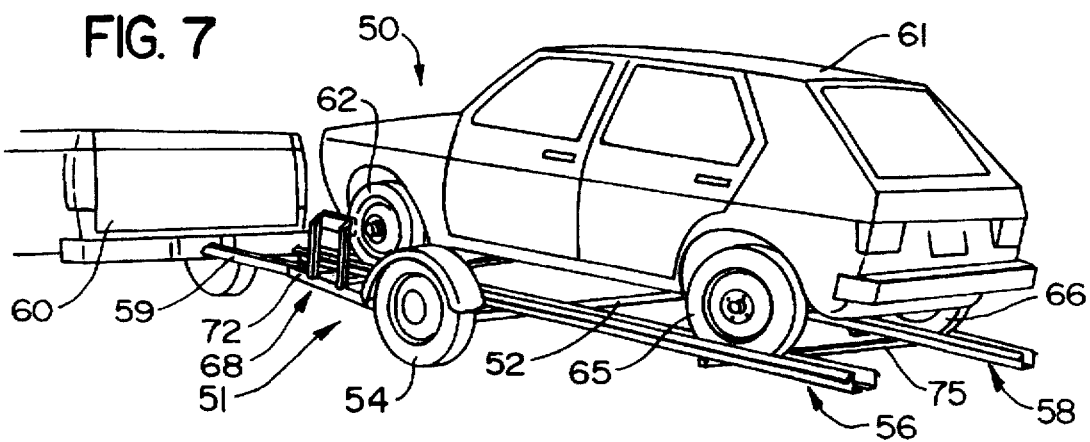
FIG. 7 is a fragmentary isometric view similar to FIGS. 1 and 6, but here depicting the vehicle to be transported partially mounted on the exemplary trailer prior to latching of the vehicle in place on the trailer.

Thus, the arrangement is such that when on-loading a vehicle 61 onto the trailer 51, the left and right C-shaped tracks 56, 58 are pivoted to a ground-engaged tilted position as shown in FIG. 6; the vehicle 61 is driven, pushed or pulled upwardly on the C-shaped tracks 56, 58 which now function as ramps; and, when the center-of-gravity of the vehicle 61 passes forwardly over the axle 52 of the trailer 51, the tracks 56, 58 pivot into a horizontal vehicle transporting plane as shown in FIG. 1 where the tracks may be secured to the trailer's V-shaped frame member 72 in any suitable manner such as that described in greater detail below. During off-loading of the vehicle 61, the left and right C-shaped tracks 56, 58 are uncoupled from the trailer's V-shaped frame member 72; the vehicle 61 is driven, pushed or pulled rearwardly thereon; and, when the center-of-gravity of the vehicle 61 passes rearwardly over the trailer's axle 52, the left and right C-shaped tracks 56, 58 pivot downwardly to the ground-engaged position shown in FIG. 7, allowing the vehicle 61 to be off-loaded from the trailer 51.

Figure 4:
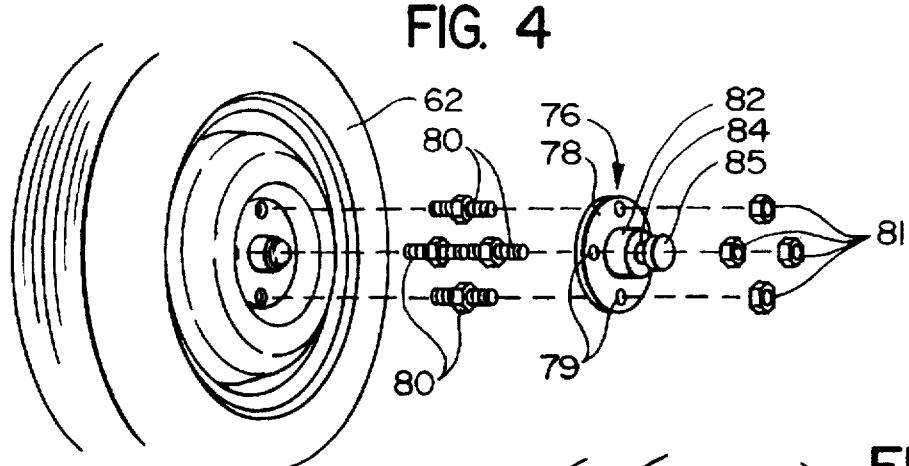
FIG. 4 is a fragmentary, exploded, isometric view here depicting a wheel latch flange incorporating features of the present invention in juxtaposition to a vehicle wheel upon which the flange is to be mounted.
Figure 5:
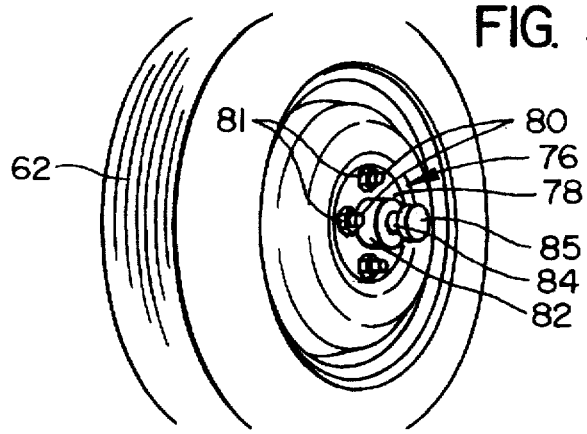
FIG. 5 is a fragmentary isometric view of the wheel and flange depicted in FIG. 4 after assembly of the flange on the wheel.

In carrying out the present invention, provision is made for automatically and fixedly, yet releaseably, attaching the vehicle 61 to the left front and right rear latch assemblies 68, 69 prior to and during transport of the vehicle 61 so as to preclude shifting of the vehicle 61 relative to the trailer 51 or other vehicle carrier (not shown) during transport. To this end, a wheel latch flange, generally indicated at 76 in FIGS. 4 and 5, is provided having a flat disk-shaped base 78 and a plurality of circumferentially spaced through openings 79 formed in the base and positioned to fit over the wheel lugs 80 which are integral with each of the vehicle's wheels—for example, the left front wheel 62 and the right rear wheel 66 (FIG. 1). The wheel latch flange 76 is then securely fastened to the appropriate wheel by attachment and tightening of lug nuts 81 as best shown in FIG. 5. In order to permit inter-engagement and interlocking of each of the wheel latch flanges 76 with the appropriate ones of the left front and right rear latch assemblies 68, 69 in a manner to be hereinafter described in greater detail, each wheel latch flange 76 is provided with an integral, laterally projecting, central co-axial stub shaft 82 defining a circular reduced diameter groove 84 slightly inboard of a relatively large diameter end portion or protuberance 85.

In accordance with one of the important aspects of the present invention, each of the left front and right rear latch assemblies 68, 69 is shaped to receive and fixedly, yet releaseably, capture and retain the wheel latch flanges 76 mounted on respective ones of the left front wheel 62 and the right rear wheel 66 of the vehicle 61 so as to fixedly, but releaseably, latch the vehicle 61 in an immovable position on the trailer 51. To accomplish this, and as best observed by reference to FIGS. 8 through 16, each of the left front and right rear latch assemblies 68, 69 is of identical construction; and, therefore, a description of one—for example, a description of the left front latch assembly 68 shown in FIGS. 8 through 16—should suffice for an understanding of the construction and operation of both latch assemblies 68, 69.

In carrying out this aspect of the present invention, and as best observed by reference to FIGS. 8 through 12 conjointly, the left front latch assembly 68 (and, therefore, the right rear latch assembly 69 which is identical in construction) includes a longitudinally extending, box-shaped latch bracket, generally indicated at 86, defined by: i) a first longitudinally extending, upper L-shaped structural member 88 having an outwardly extending upper leg or flange 89 and an inboard downwardly extending leg or upper flange 90 disposed at right angles with respect thereto; ii) a second longitudinally extending lower L-shaped structural member 91 having an outwardly extending bottom leg or flange 92 and an inboard upwardly extending leg or bottom flange 94 disposed at right angles with respect thereto, with the downwardly extending upper flange 90 and the upwardly extending bottom flange 94 being co-planar and defining an intermediate longitudinally extending gap or slot 95 between the longitudinally extending free edges of the co-planar flanges 90, 94; iii) a vertically extending front plate 96 (FIGS. 8, 9 and 11) welded or otherwise fixedly secured to each of the first and second L-shaped structural members 88, 91 and defining a front stop; iv) a front vertical support post 98 formed of tubular or bar stock welded or otherwise fixedly secured to the outermost edge of the outwardly extending upper flange 89 on the first L-shaped structural member 88 and the outermost edge of the outwardly extending bottom flange 92 on the second L-shaped structural member 91 adjacent the forward ends of the longitudinally extending L-shaped structural members 88, 91; and v), a rear vertical support post 99 formed of tubular or bar stock welded or otherwise securely affixed to the outermost edge of the longitudinally extending upper flange 89 of the first L-shaped structural member 88 and the outermost edge of the outwardly extending bottom flange 92 on the second L-shaped structural member 91 adjacent the rear ends of the longitudinally extending L-shaped structural members 88, 91.

The arrangement is such that the lower ends of the upright vertical support posts 98, 99 in each of the left front and right rear latch assemblies 68, 69 may be securely and fixedly, yet adjustably, attached to the trailer's support structure adjacent the ends of the front and rear cross supports 74, 75. It will be understood by those skilled in the art that while the particular structure employed for attaching the left front and right rear latch assemblies 68, 69 to the frame of the trailer and, more specifically, to respective ones of the front and rear cross supports 74, 75, is not critical to the present invention, such structure may, for example, take the form hereinafter described in connection with FIGS. 21 through 24.

Suffice it to say at this point that the left front and right rear latch assemblies 68, 69 should be mounted with freedom for at least vertical adjustment relative to the respective ones of the left and right C-shaped tracks 56, 58 so that the box-shaped latch brackets 86 can be adjusted vertically to permit registration of the longitudinally extending slots 95 formed therein with the circumferential grooves 84 on the stub shafts 82 forming part of the wheel latch flanges 76 on any given vehicle's left front and right rear wheels. Since the size of the wheels on any given vehicle may vary from vehicle to vehicle, provision must be made for enabling at least vertical adjustment of the latch assemblies 68, 69. Additionally, where desired, the latch assemblies 68, 69 and the front and rear cross supports 74, 75 can also be designed to permit fore/aft adjustment thereof relative to respective ones of the C-shaped tracks 56, 58 and/or lateral or side-to-side adjustment with respect to the front and rear cross supports 74, 75, thereby permitting adjustment of the latch assemblies 68, 69 to accommodate vehicles having differing wheelbases in terms of height, length and/or width.

Thus, the arrangement is such that during a vehicle on-loading operation, the left and right C-shaped tracks 56, 58 are released from locked engagement with the trailer 51 (in a manner hereinafter described) and are pivoted about the trailer's axle 52 into the position shown in FIG. 6 where their rearmost ends are engaged with the ground. A vehicle 61 having a wheel latch flange 76 (FIGS. 4 and 5) fixedly secured to each of the vehicle's left front and right rear wheels 62, 66 is then driven, pushed or pulled up onto, and forwardly on, the left and right C-shaped tracks/ramps 56, 58 as shown in FIG. 7. As the center-of-gravity of the vehicle 61 passes forwardly over the trailer's axle 52, the weight of the vehicle causes the C-shaped tracks 56, 58 to pivot about the vehicle's axle 52 into a horizontal plane with the front ends of the C-shaped tracks supported on the trailer's V-shaped frame member 72 and with the C-shaped tracks 56, 58, lying in a substantially horizontal plane as shown in FIGS. 1 and 3.

As the vehicle 61 moves forward relative to the C-shaped tracks 56, 58, the laterally projecting stub shafts 82 on the wheel latch flanges 76 mounted on the left front and right rear wheels 62, 66 of the vehicle 61 are brought into registration with the longitudinally extending slots 95 defined by the inboard, downwardly extending, upper flanges 90 and the inboard, upwardly extending, bottom flanges 94 on the box-shaped latch brackets 86 associated with respective ones of the left front and right rear latch assemblies 68, 69. As the vehicle 61 continues to move in the forward direction, the circular grooves 84 formed in the stub shafts 82 of the left front and right rear wheel latch flanges 76 transit along the longitudinally extending slots 95 with the lower and upper edges of the downwardly and upwardly extending inboard co-planar flanges 90, 94 on the box-shaped latch brackets 86 associated with the left front and right rear latch assemblies 68, 69 being received within the circular grooves 84 in the stub shafts 82 associated with the wheel latch flanges 76 on respective ones of the left front and right rear wheels 62, 66 of the vehicle 61.

Figure 11:
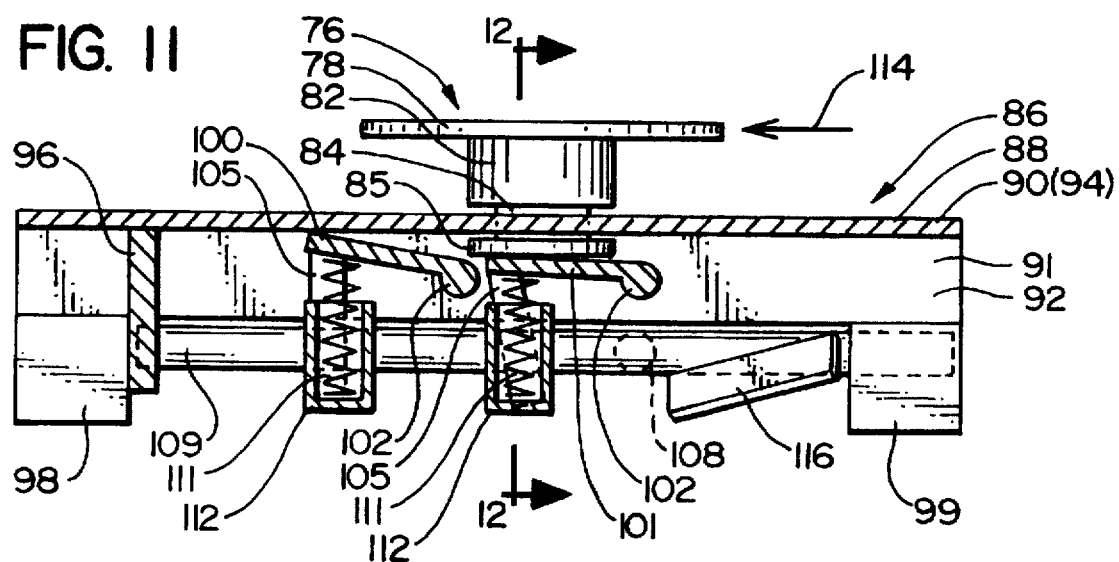
FIG. 11 is a sectional view similar to FIG. 9, but here illustrating the latch assembly prior to latching of the vehicle and as the vehicle is being loaded onto the carrier and is moving from right to left as viewed in the drawing.

In this condition, and as best noted upon inspection of FIG. 11, it will be observed that: i) the enlarged inboard portion of the stub shaft 82 on each wheel latch flange 76 (FIGS. 4 and 5) is disposed inboard of the co-planar, spaced apart, inboard flanges 90, 94 formed on the box-shaped latch brackets 86; ii) the co-planar, spaced apart, inboard flanges 90, 94 on the box-shaped latch brackets 86 are disposed within the circular grooves 84 in the stub shafts 82; and iii), the enlarged diameter protuberances 85 on the outboard ends of the stub shafts 82—which protuberances 85 have a diameter greater than the height of the longitudinally extending slots 95 defined by the co-planar, spaced apart, inboard flanges 90, 94 of the box-shaped latch brackets 86—are disposed outboard of the co-planar flanges 90, 94 on the longitudinally extending, rectangular, tubular box-shaped latch brackets 86; thereby securely capturing the wheel latch flanges 76 on the left front and right rear wheels 62, 66 of the vehicle 61 in respective ones of the left front and right rear latch assemblies 68, 69 so as to thereby restrain the vehicle 61 from both vertical movement and lateral movement with respect: i) to the left front and right rear latch assemblies 68, 69; ii) the left and right C-shaped tracks 56, 58 adjacent which the latch assemblies 68, 69 are respectively mounted; and iii), the trailer 51.

In further keeping with the invention, provision is made for positively, yet releaseably, latching the vehicle 61 to the vehicle carrier 51 through inter-engagement of the wheel latch flanges 76 mounted on the left front and right rear wheels 62, 66 of the vehicle 61 and respective ones of the left front and right rear latch assemblies 68, 69 in such a manner as to prevent not only lateral or side-to-side movement and vertical movement of the vehicle 61 relative to the trailer 51 but, in addition, to prevent fore/aft movement of the vehicle 61 relative to the trailer 51. To accomplish this, a pair of flat, generally rectangular, plate-like safety latches 100, 101 are pivotally mounted in each box-shaped latch bracket 86 with each plate-like safety latch 100, 101 including an integral, vertically extending, pivot pin 102 formed along its rearmost edge with the pivot pins 102 being journaled for rotation about vertical axes in: i) the outwardly extending upper flange 89 of the first longitudinally extending L-shaped structural member 88; and ii), the outwardly extending bottom flange 92 of the second longitudinally extending L-shaped structural member 91.

Figure 10:
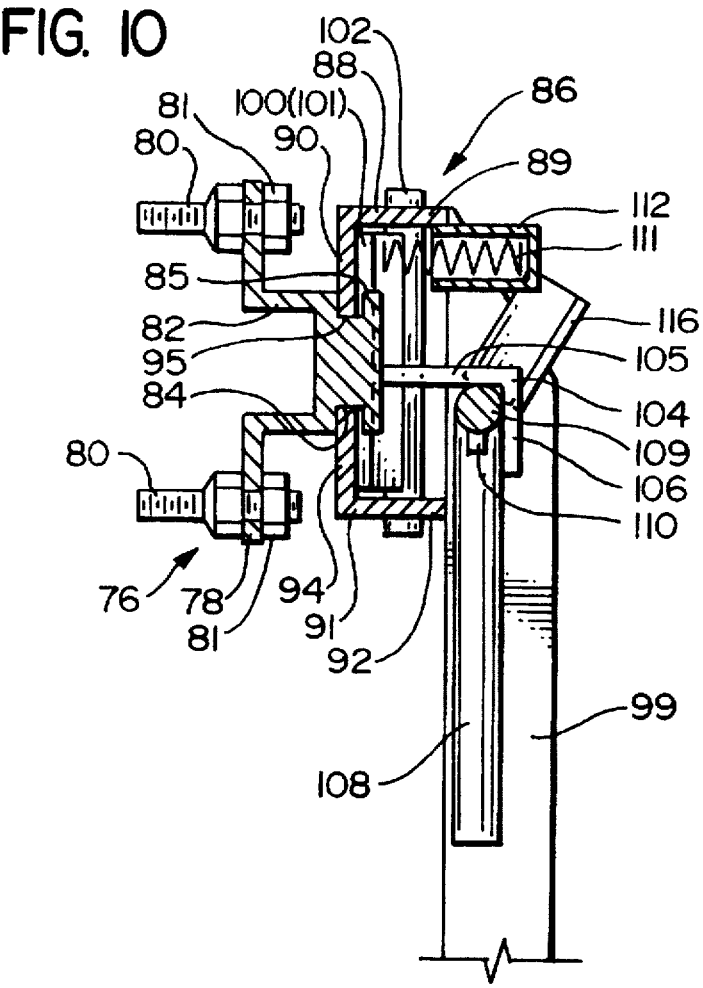
FIG. 10 is a vertical sectional view taken substantially along the line 10—10 in FIG. 8, here depicting details of the latch assembly in its fully latched state.
Figure 12:
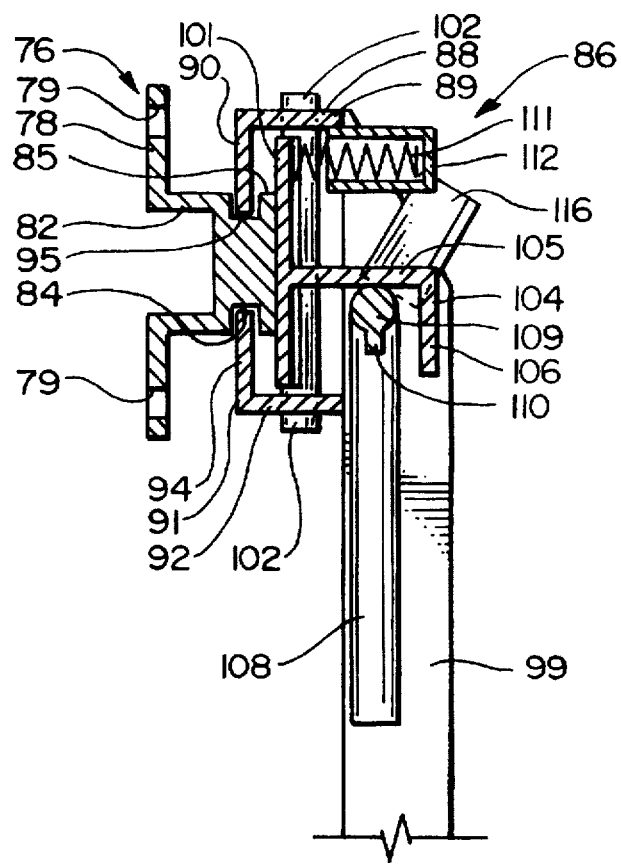
FIG. 12 is a vertical cross-sectional view similar to FIG. 10, but here taken substantially along the line 12—12 in FIG. 11 and illustrating the positions of the latching components when the wheel of the vehicle to be transported and the wheel latch flange are in the positions shown in FIG. 11 prior to full latching thereof.

As best observed in FIGS. 10 and 12, the outermost vertical surface of each flat, rectangular plate-like safety latch 100, 101 is integrally attached adjacent the center of its leading edge to an L-shaped cam actuator 104 having an outwardly extending horizontal leg 105 and an outboard downwardly extending vertical leg 106. A latch actuating handle 108 is rigidly mounted on, and attached at right angles to, a horizontally disposed latch actuating camshaft 109 journaled at its forward end in the vertical front plate 96 and at its rear end in the rear vertical support post 99. The horizontal latch actuating camshaft 109 passes under the horizontal legs 105 and inboard of the vertical legs 106 of the two L-shaped cam actuators 104 respectively attached to each of the front and rear plate-like safety latches 100, 101; and, is further provided with a longitudinally extending, radially projecting, cam actuator 110 lying in the plane of the latch actuating handle 108.

Figure 8:
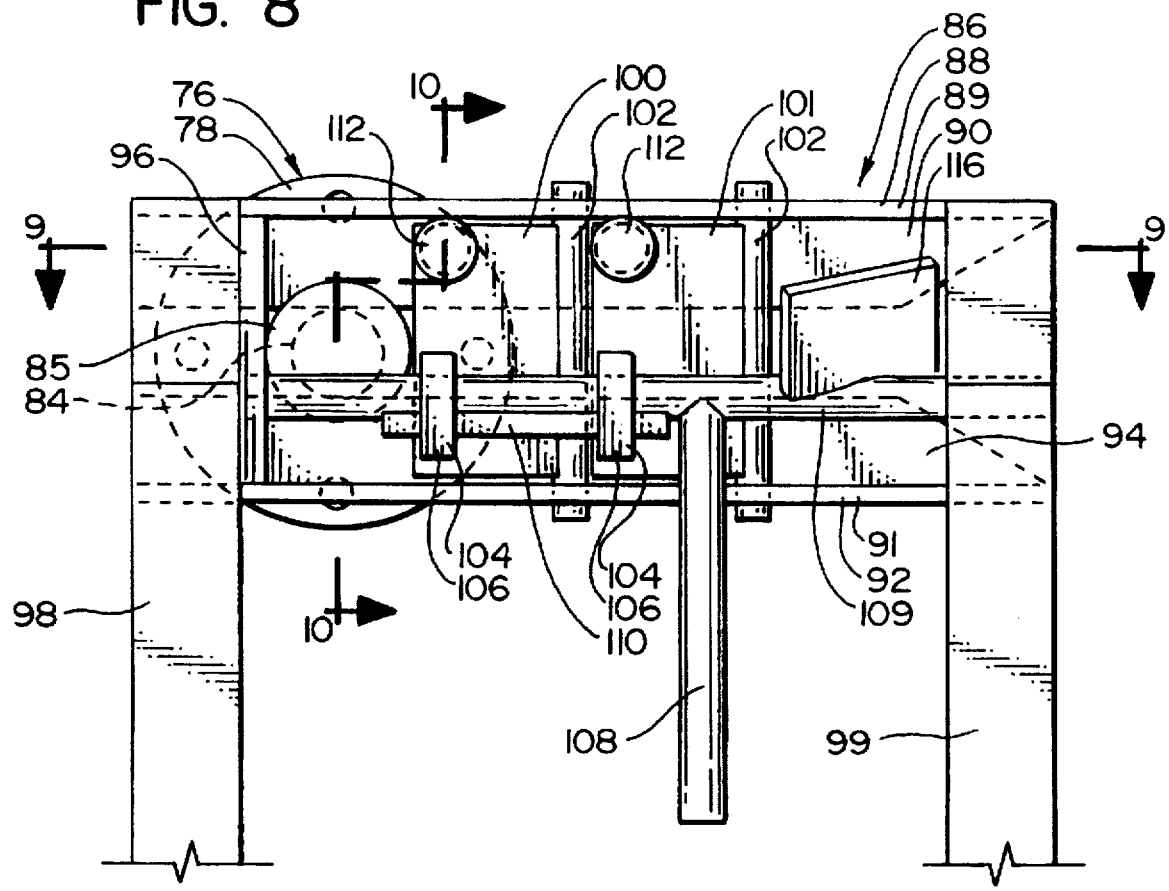
FIG. 8 is a fragmentary side elevational view here illustrating details of an automatic latch assembly embodying features of the present invention with the latch assembly latchably engaged with the wheel latch flange mounted on the vehicle's left front wheel.
Figure 9:
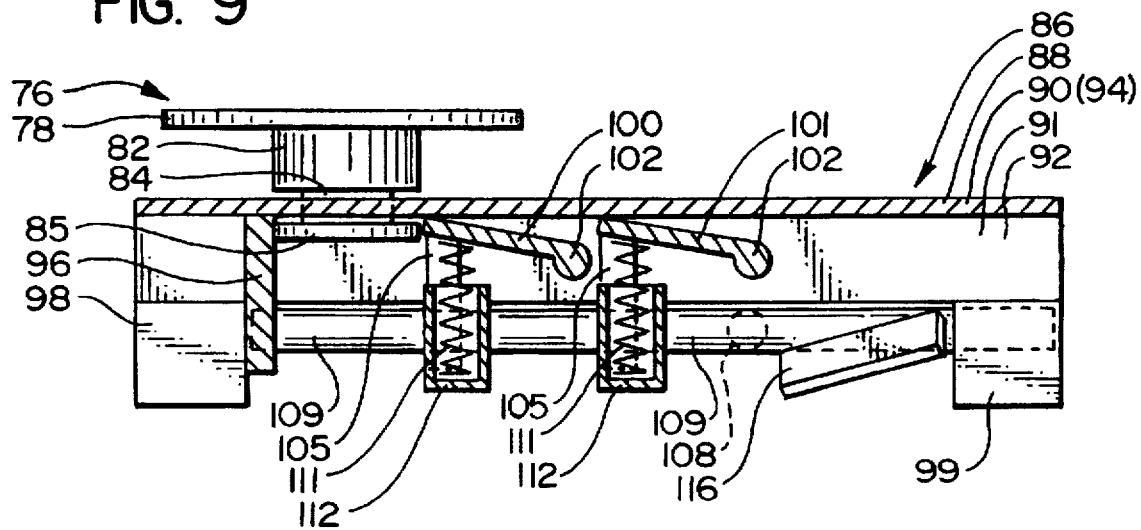
FIG. 9 is a horizontal sectional view taken substantially along the line 9—9 in FIG. 8, again depicting the wheel latch flange on the vehicle's left front wheel firmly latched in position on the trailer.

Each of the flat rectangular plate-like safety latches 100, 101 is spring biased into its normally latched state as best shown by reference to FIGS. 9 and 10 conjointly. To accomplish this, a pair of front and rear coil springs 111 are mounted in respective ones of a pair of spring housings 112 welded or otherwise fixedly secured to the outboard extremity of the outwardly extending upper flange 89 on the first longitudinally extending L-shaped structural member 88, with each spring 111 and its associated housing 112 being disposed above the horizontal leg 105 of the L-shaped cam actuator 104 associated with each of the front and rear plate-like safety latches 100, 101. Thus, the arrangement is such that when the latch actuating handle 108 is in its inoperative "latch engaged" vertical position shown in FIGS. 8, 9 and 10, the coil springs 111 act to urge the leading edges of the front and rear plate-like safety latches 100, 101 in a clockwise direction as viewed in FIG. 9 about their respective vertical pivot pins 102, thus positioning the plate-like safety latches 100, 101 in the "latch engaged" position.

Having the foregoing in mind, and with particular reference to FIGS. 11 and 9, it will be appreciated that as the vehicle 61 (not shown in FIGS. 11 and 9) moves in a forward direction as indicated by the arrow 114 (FIG. 11), the wheel latch flange 76 mounted on each of the vehicle's left front and right rear wheels 62, 66 (FIGS. 1 and 7) moves from right to left as viewed in the drawing, with the enlarged protuberance 85 on the outboard end of each wheel latch flange's stub shaft 82 entering into the vertical gap between the pivot pin 102 of the rearmost plate-like safety latch 101 and the co-planar vertical flanges 90, 94 on the box-shaped latch bracket 86. As the vehicle 61 and, therefore, the left front and right rear wheel latch flanges 76 continue to move from right to left in a forward direction, the enlarged protuberance 85 on the wheel latch flange's stub shaft 82 serves to cam the rear plate-like safety latch 101 in a counterclockwise direction as viewed in FIG. 11 about the pivot pin 102. As the forward motion continues, the enlarged protuberance 85 next enters the gap between the pivot pin 102 on the front plate-like safety latch 100 and the co-planar vertical flanges 90, 94, pivoting the front plate-like safety latch 100 in a counterclockwise direction about its pivot pin 102 as viewed in FIG. 11.

It will be apparent that as the wheel latch flange 76 continues to move in a forward direction—i.e., from right to left as viewed in FIG. 11—it will first pass beyond the rear plate-like safety latch 101 which will, under the biasing action of the spring 111, then rotate in a clockwise direction as viewed in the drawing about its pivot pin 102 into the fully latched position shown in FIG. 9; and, thereafter, when the wheel latch flange 76 passes beyond the front plate-like safety latch 100, the latter will, under the biasing action of its associated spring 111, also rotate in a clockwise direction about its pivot pin 102 into the fully latched state shown in FIG. 9. At this point the wheel latch flange 76 is essentially immobilized—that is, it is prevented from further forward movement by engagement of its enlarged protuberance 85 with the front plate or stop 96; it is precluded from rearward movement by virtue of engagement of its enlarged protuberance 85 with the front latch plate 100; it is precluded from lateral movement because of inter-engagement between the enlarged diameter inboard end of the stub shaft 82 and enlarged outboard protuberance 85 which respectively lie on opposite sides of the co-planar vertical flanges 90, 94; and, it is precluded from vertical up and down movement by virtue of interaction between the reduced diameter portion of the stub shaft 82 in the region of the groove 84 and the lower and upper edges of respective ones of the upper and lower co-planar vertical flanges 90, 94.

Figure 13:
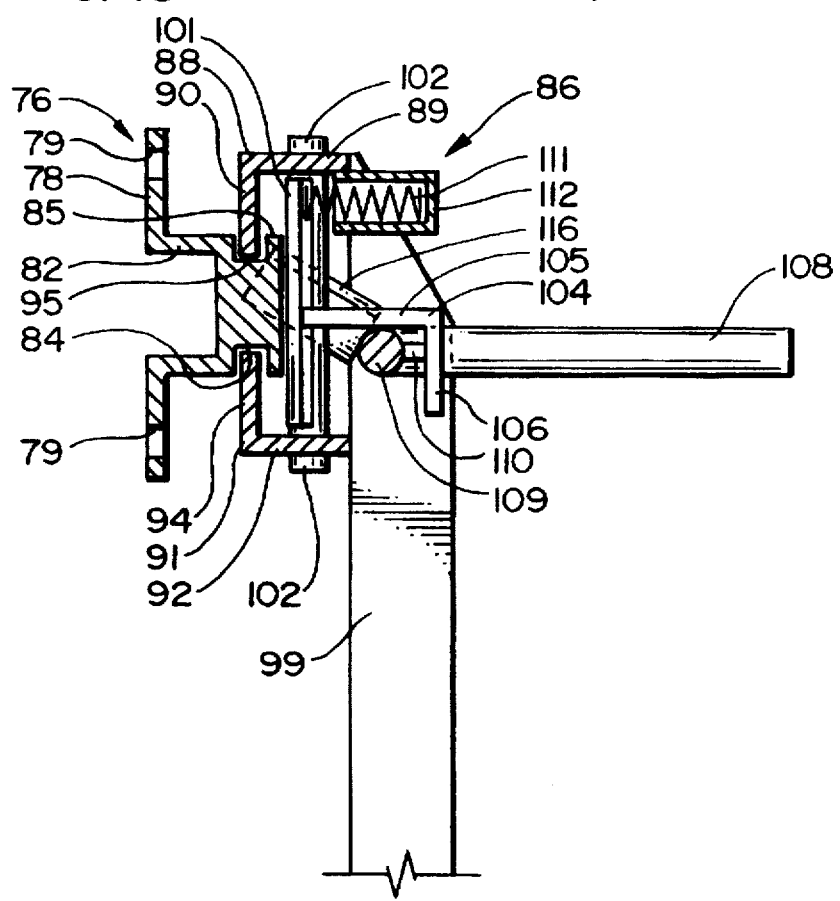
FIG. 13 is a vertical cross-sectional view similar to FIGS. 10 and 12, but here illustrating the latch assembly in the unlatched state with the latch actuating handle rotated in a counterclockwise direction as viewed in the drawing through an angle of approximately 90° from the latched position shown in FIGS. 10 and 12.

In order to unlatch the left front and right rear latch assemblies 68, 69 so as to permit off-loading of the vehicle 61 (FIG. 1), and as best observed by reference to FIGS. 10, 12, 13 and 14 conjointly, it is merely necessary for the operator to shift the latch actuating handle 108 from its vertical inoperative or "latch engaged" position shown in FIGS. 10 and 12 to its horizontal operative "latch disengaged" position shown in FIGS. 13 and 4. Thus, as the latch actuating handle 108 is rotated in a counterclockwise direction as viewed in the drawings through an angle of approximately 90°, the longitudinally extending radial cam actuator 110 on the horizontal latch actuating camshaft 109 is shifted from the six o'clock (6:00) position shown in FIG. 10 to the nine o'clock (9:00) position shown in FIG. 13; and, as it shifts, it engages the vertical legs 106 on the L-shaped cam actuators 104 associated with, and integrally interconnected to, each of the front and rear plate-like safety latches 100, 101, causing the later to rotate in a counterclockwise direction from their full "latch engaged" position shown in FIG. 9 to their full "latch disengaged" position shown in FIG. 14.

Accordingly, the wheel latch flanges 76 on the left front and right rear wheels 62, 66 of the vehicle 61, although still prevented from forward movement by the front stop plates 96 and from lateral side-to-side and/or vertical up/down movement by the vertical co-planar flanges 90, 94 on the box-shaped latch brackets 86, can, nevertheless, freely move in a rearward direction as indicated by the arrow 115 in FIGS. 14 and 15A, thereby permitting off-loading of the vehicle 61 from the vehicle carrier 51.

Of course, those skilled in the art will appreciate that the invention is not limited to a manually operable unlatching assembly employing a latch actuating handle 108 which is manually shifted to the "latch disengaged" state by the operator. Rather, clockwise movement of the front and rear plate-like safety latches 100, 101 about their respective pivot pins 102 can, where desired, be accomplished using hydraulic, pneumatic, electric and/or electro/mechanical actuation devices (not shown) of any desired conventional type well known to persons skilled in the art.

In keeping with yet another of the important aspects of the present invention, provision is made for automatically restoring the front and rear plate-like safety latches 100, 101 to their full "latch engaged" state during, an incident to, a vehicle off-loading operation without requiring intervention by the operator. To accomplish this, a latch reset ramp 116 is mounted on the latch actuating camshaft 109 aft of the rear plate-like safety latch 101. As best shown in FIGS. 9 through 12, the latch reset ramp 116 is mounted on the camshaft 109 in such a position that it is out of the path of movement of the enlarged protuberance 85 on the wheel latch flange 76 when the latch actuating handle 108 is in the vertical "latch engaged" position shown in the drawings. However, when the latch actuating handle 108 is rotated through an angle of approximately 90° from the "latch engaged" position shown in FIGS. 8 through 12 to the "latch disengaged" position shown in FIGS. 13, 14, 15A and 15B, the horizontal latch actuating camshaft 109 is rotated about its horizontal axis through a comparable angle of approximately 90°, shifting the latch reset ramp 116 into the path of movement of the enlarged protuberance 85 on the wheel latch flange 76.

Figure 16:
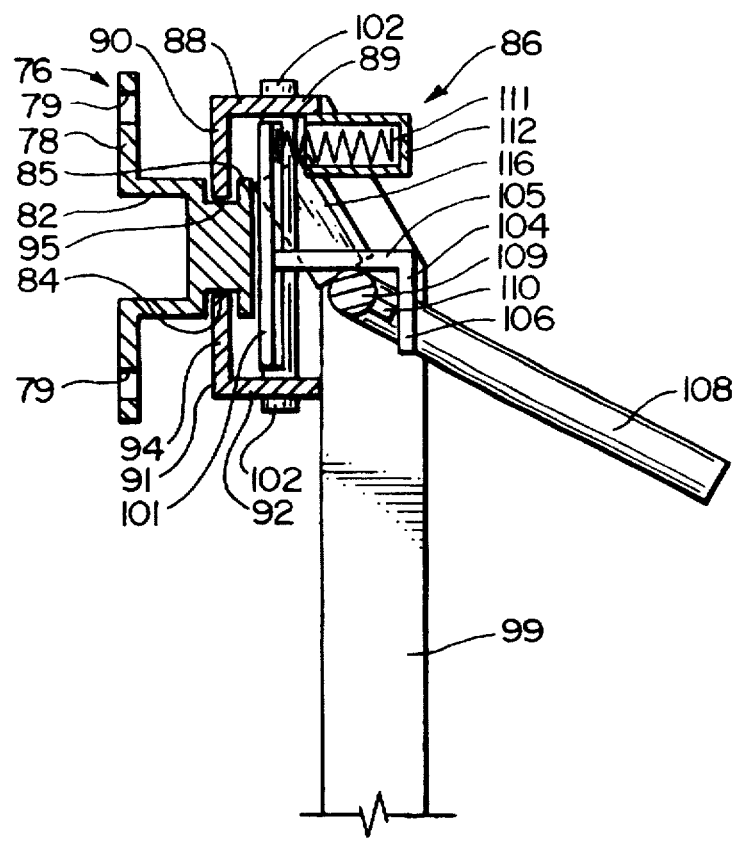
FIG. 16 is a vertical cross-sectional view similar to FIGS. 10 and 12, but here illustrating the latch assembly at that point in time when the reset ramp is fully deflected by the wheel latch flange and the latch assembly is set to automatically snap into the fully latched state.

Consequently, as the enlarged protuberance 85 moves rearwardly in the direction of arrow 115 from the position shown in FIG. 15A to the position shown in FIG. 15B, it engages the latch reset ramp 116 and starts to rotate the camshaft 109 and the latch actuating handle 108 from the "latch disengaged" position shown in FIG. 13 through the position shown in FIG. 16 where the longitudinally extending radial cam actuator 110 on the camshaft 109 begins to release the outward force exerted thereby on the vertical legs 106 on the L-shaped cam actuators 104 mounted on each of the front and rear late-like safety latches 100, 101. This permits the spring bias provided by the coil springs 111 to shift the front and rear plate-like safety latches 100, 101 from the "latch disengaged" position shown in FIGS. 13 through 15B to the "latched engaged" position shown in FIGS. 8 through 10; and, as the camshaft 109 is rotated by coaction between the enlarged protuberance 85 on the wheel latch flange 76 and the latch reset ramp 116 on the camshaft 109, the latch actuating handle 108 is pivoted from the horizontal "latch disengaged" position shown in FIG. 13 through the intermediate position shown in FIG. 16 and back to the "latch engaged" position shown in FIG. 10.

It will, of course, be apparent to persons skilled in the art that the provision of front and rear plate-like safety latches 100, 101 associated with each of the left front and right rear latch assemblies 68, 69 ensures redundant safety characteristics, precluding inadvertent rearward movement of the vehicle 61 (FIG. 1) being transported on the vehicle carrier 51 and consequent unintentional and undesired off-loading thereof. Thus, a single operable plate-like safety latch—whether it be the front safety latch 100 associated with the left front latch assembly 68, the front safety latch 100 associated with the right rear latch assembly 69, the rear safety latch 101 associated with the left front latch assembly 68, or the rear safety latch 101 associated with the right rear latch assembly 69—is sufficient to preclude rearward movement of the wheel latch flange 76 on the one of the left front and right rear wheels 62, 66 with which such single operable safety latch coacts. In short, before inadvertent and undesirable unlatching of the vehicle 61 can occur, it is necessary for each and every one of the four (4) safety latches 100, 101 to break, fail or otherwise become inoperative.

Consequently, it will be appreciated that the provision of two serially oriented plate-like safety latches 100, 101 with each latch assembly 68, 69 provides four-fold redundant safety. And, of course, such safety features are provided irrespective of whether the two latch assemblies 68, 69 are associated with: i) the left front and right rear wheels 62, 66; ii) the right front and left rear wheels 64, 65; iii) the left front and right front wheels 62, 64; or iv), the left rear and right rear wheels 65, 66. Indeed, the redundant safety features described above can be attained, and in some instances even further enhanced, by providing latch assemblies associated with any two, three or all four of the vehicle's wheels. Moreover, the system will effectively latch the vehicle 61 in place on the vehicle carrier 51 even where only a single latch assembly is provided; and, even in this instance, the provision of front and rear plate-like safety latches 100, 101 still provides a redundant safety feature.

Figure 17:
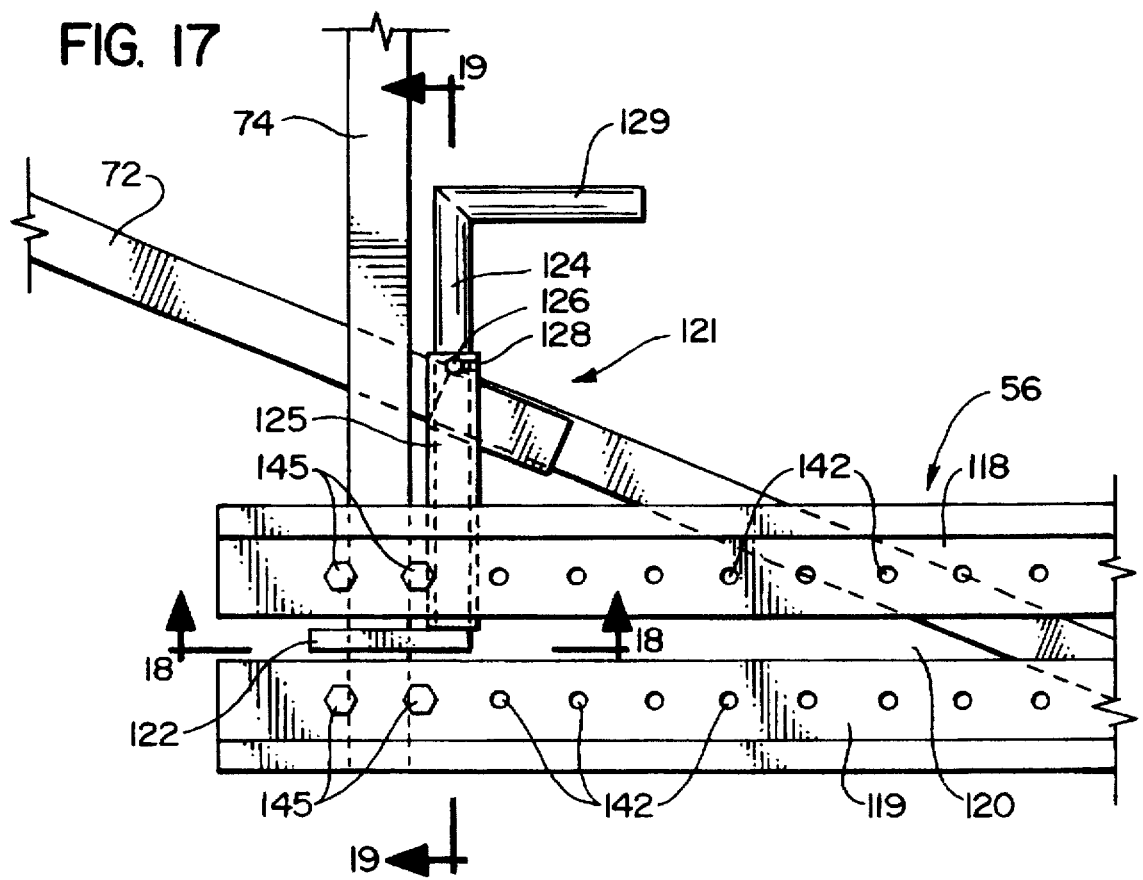
FIG. 17 is a fragmentary plan view of the front left quadrant of the trailer with the front left latch assembly removed for purposes of clarity, here depicting a carrier holddown mechanism employed in accordance with the invention to maintain the vehicle carrier in a fixed horizontal position incapable of tilting movement when a vehicle being transported is fully mounted thereon and latched in place.

In furtherance of the enhanced safety features of the present invention, and as will best be understood by reference to FIGS. 17 through 20 in conjunction with the ensuing description, provision is made for minimizing—and, indeed, virtually eliminating—the danger that the tiltable portion of the frame of the vehicle carrier 51 comprising the left and right C-shaped tracks 56, 58 and their interconnected support structure defined by the front and rear cross supports 74, 75 (FIGS. 1–3) might accidentally tilt with respect to the non-tiltable V-shaped frame member 72 during transport of a vehicle 61. To this end, advantage is taken of the fact that in the illustrative and exemplary form of the invention, the left and right C-shaped vehicle tracks 56, 58 are each formed from a pair of longitudinally extending, slightly spaced apart, L-shaped track members 118, 119 defining a slot 120 therebetween which extends the entire length of each C-shaped track 56, 58, as best shown in FIGS. 2, 17, and 19.

In keeping with this aspect of the invention, a vehicle actuated holddown mechanism, generally indicated at 121 in FIGS. 17 through 20, is provided for insuring that whenever a vehicle 61 is loaded on the trailer 51, the tiltable bed of the trailer defined by the left and right C-shaped tracks 56, 58 and the front and rear cross supports 74, 75 is positively clamped to the non-tiltable V-shaped trailer frame member 72. To this end, the exemplary vehicle actuated holddown mechanism 121 includes a slightly rounded, but generally flat, holddown clamp 122 which is mounted on the non-tiltable V-shaped frame member 72 with freedom for rotation through an angle of approximately 90° between: i) a first generally horizontal position (FIGS. 17 through 19) where the holddown clamp 122 is positioned within the slot 120 between the L-shaped track members 118, 119 defining the left C-shaped track 56 and in overlying face-to-face contact with the front cross support 74; and ii), a second generally vertical position (FIG. 20) wherein the holddown clamp 122 is disengaged from the front cross support 74.

More particularly, the holddown clamp 122 is rigidly secured at its rearmost end to the outboard end of a round holddown rod 124 which is rotatably journaled in a transverse sleeve 125 welded or otherwise permanently affixed to the non-tiltable V-shaped frame member 72 immediately aft of the front cross support 74. The holddown rod 124 is precluded from axial movement relative to the sleeve 125 and constrained for limited rotational movement relative to the sleeve 125 through an angle of not more than 90° by a machine screw or bolt 126 (FIGS. 17 and 19) which is passed through a slot 128 formed adjacent the inboard end of the sleeve 125 and threaded into the holddown rod 124. Thus, coaction between the machine screw or bolt 126 and the slot 128 in sleeve 125, permits rotation of the rod 124 through an angle of not more than 90°.

Figure 20:
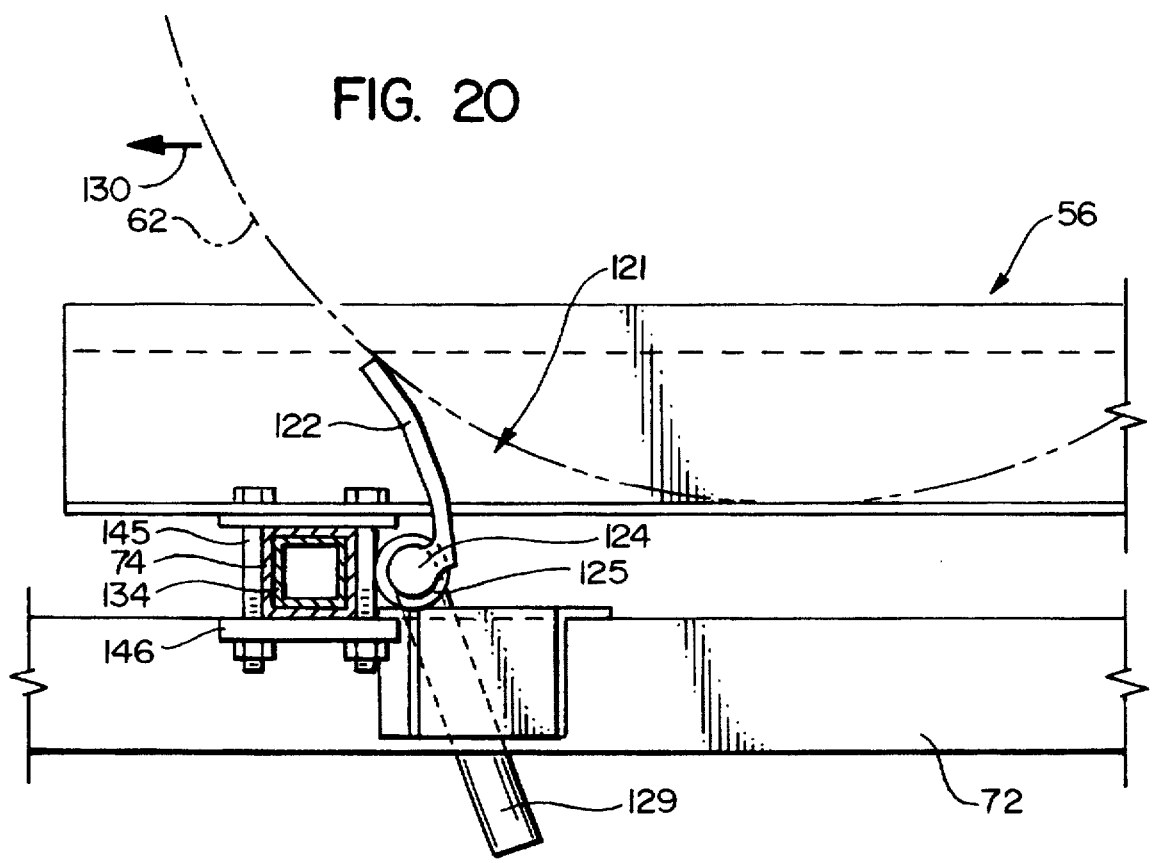
FIG. 20 is a fragmentary side elevational view similar to FIG. 18, but here illustrating in particular the actuation of the vehicle carrier holddown mechanism by the vehicle as it moves from the partially loaded unlatched position (FIG. 20) towards the fully loaded and latched position (FIG. 18)
Figure 21:
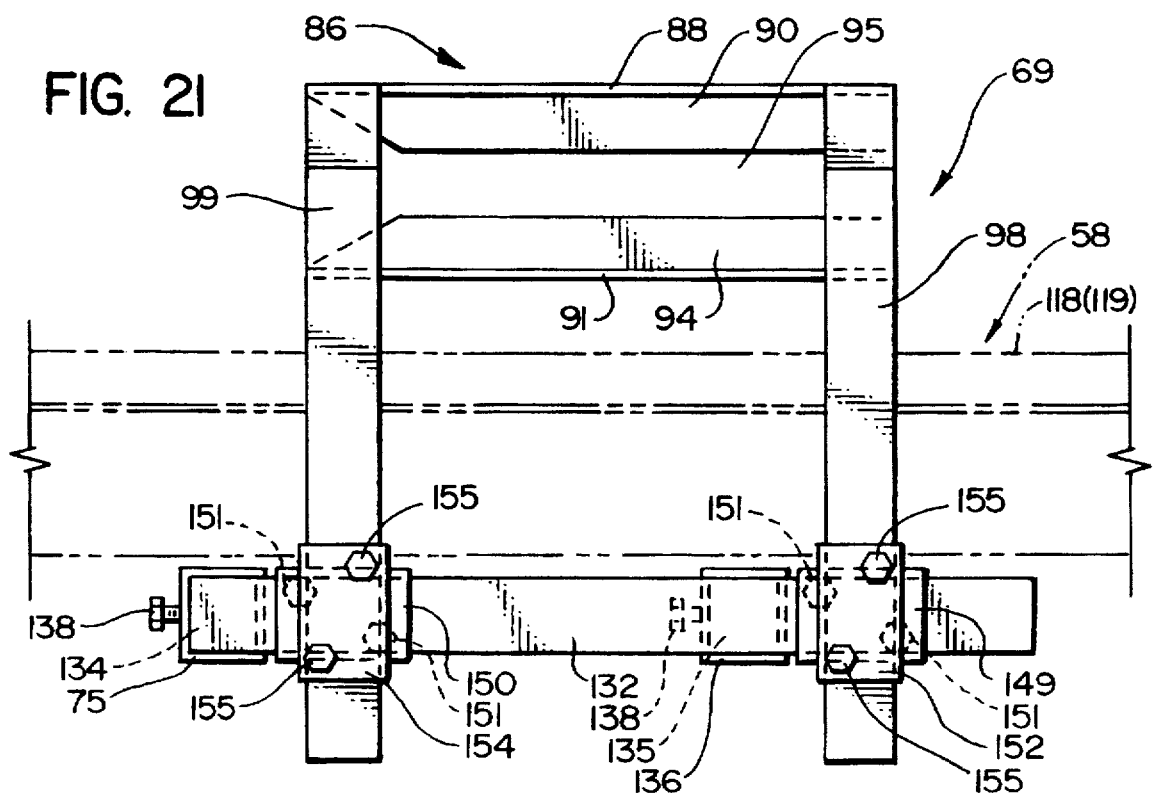
FIG. 21 is a fragmentary side elevational view taken substantially along the line 21—21 in FIG. 2, here depicting details of the right rear wheel latch assembly as adjustably attached to the rear end of the exemplary right trailer ramp.

Holddown rod 124 is further provided with a rearwardly projecting, right angularly related leg 129 at its inboard end which is of sufficient length, bulk and weight to more than counterbalance the effect of the holddown clamp 122 at the opposite end of the rod 124, thereby serving to normally bias the rod 124 to the limit of its permissible clockwise rotation as viewed in FIG. 20 so as to normally disengage the holddown clamp 122 from the front cross support 74 and render the holddown mechanism 121 inoperative, thereby permitting tilting of the trailer's left and right C-shaped tracks 56, 58 during a vehicle on-loading or off-loading operation.

In operation, and assuming that the left and right C-shaped tracks 56, 58 have been tilted into a ground-engaged position so as to permit on-loading of a vehicle 61 as shown in FIG. 7, as the vehicle 61 moves forwardly along the tracks 56, 58 and its center-of-gravity passes forwardly beyond the trailer's axle 52, the C-shaped tracks 56, 58 pivot about the axle 52 from the ground-engaged ramp position (FIG. 6) to a substantially horizontal plane (FIG. 3) where the front cross support 74 secured to the front ends of the left and right C-shaped tracks 56, 58 is supported on the upper surface of the trailer's non-tiltable V-shaped frame member 72. As the vehicle 61 continues to move in a forward direction in the manner indicated by the arrow 130 in FIG. 20, the left front wheel 62 on the vehicle engages the upwardly projecting holddown clamp 122 and causes the clamp 122 and its holddown rod 124 to rotate in a counter-clockwise direction as viewed in FIG. 20 from the position shown in FIG. 20 to that shown in FIG. 18. Consequently, while further forward movement of the vehicle 61 is precluded by engagement of the enlarged protuberance 85 on the left front wheel latch flange 76 with the fixed stop 96 as shown in FIGS. 8 and 9, the front left wheel 62 of the vehicle 61, which rests on the holddown clamp 122 as shown in FIG. 18, serves to positively clamp the tiltable portion of the trailer 51 to a non-tiltable V-shaped frame member 72. More specifically, since the weight of the vehicle 61 is now pressing downwardly on the holddown clamp 122 and urging it into contact with the front cross support 74, and since the sleeve 125 within which the holddown rod 124 is journaled is welded or otherwise permanently affixed to the non-tiltable V-shaped frame 72 on the trailer 51, the front cross support 74 and, consequently, the left and right C-shaped tracks 56, 58 are effectively prevented from tilting.

During a vehicle off-loading operation when it is desired to again enable the C-shaped tracks 56, 58 to tilt into a ground-engaged position, the left front and right rear wheel latch flanges 76 are unlatched in the manner previously described, permitting the vehicle 61 to be driven, pushed or pulled rearwardly. As the vehicle begins to move rearwardly, the left front wheel 62 moves rearwardly off the holddown clamp 122 which is then free to rotate to the vertical position shown in FIG. 20, thereby disabling the clamped connection between the front cross support 74 and the trailer's non-tiltable V-shaped frame member 72. Because of the counterbalancing effect of the rearwardly extending leg 129 on the inboard end of the holddown rod 124, the holddown mechanism 121 is biased towards the position shown in FIG. 20. As the vehicle 61 continues to move rearwardly and its center-of-gravity passes rearwardly over the vehicle's axle 52 (FIGS. 2 and 3), the left and right C-shaped tracks 56, 58 and the front and rear cross supports 74, 75 tilt in a clockwise direction as viewed in FIGS. 3 and 20, positioning the rear ends of the tracks 56, 58 in the ground-engaged ramp position.

In the event that any dirt or other contaminant present prevents free rotation of the holddown mechanism 121 to the position shown in FIG. 20, since there is no positive resistance to tilting of the tracks 56, 58, and since the weight of the vehicle 61 is promoting tilting, the C-shaped tracks 56, 58 and the front and rear cross supports 74, 75 will pivot to the tilted ground-engaged position and the front cross support 74 will assist the counterbalancing effect of the rearwardly extending leg 129 in shifting the holddown clamp 122 into the vertical position shown in FIG. 20.

Turning now to FIGS. 21 through 24, the structural details employed in the exemplary vehicle carrying system 50 (FIG. 1) for assembling the left and right C-shaped tracks 56, 58 to the front and rear cross supports 74, 75 of the exemplary vehicle carrier 51, as well as for assembling the left front and right rear latch assemblies 68, 69 to the frame of the carrier 51, will be described in greater detail. Those skilled in the art will appreciate as the ensuing description proceeds that the structural details employed for assembling the front and rear ends of the left and right C-shaped tracks 56, 58 to the front and rear cross supports 74, 75 are identical; and, therefore, a description of the assembly details for attaching the rear end of the right C-shaped track 58 to the right extremity of the rear cross support 75 will be equally applicable to the assembly details for attaching the front end of the right C-shaped track 58 to the right extremity of the front cross support 74. And, of course, the assembly details for attaching the left C-shaped track 56 to the left extremities of both the front and rear cross supports 74, 75 will be identical to those described for attaching the right C-shaped track to the right extremities thereof. Similarly, the ensuing description, insofar as it relates to assembly details pertaining to the right rear latch assembly 69, is equally applicable to the assembly details for attaching the left front latch assembly 68 to the trailer 51.

Turning first to FIGS. 21 through 24 conjointly, it will be observed that the right extremity of the rear cross support 75 is of hollow, rectangular, tubular shape. A horizontally disposed, generally U-shaped support member 131 having a longitudinally extending base leg 132 and a pair of inwardly projecting, parallel, spaced apart rear and front transverse legs 134, 135 is provided with leg 134 being complemental in shape to, and telescopically mounted within, the right rear cross support 75 with freedom for inboard/outboard slideable movement with respect thereto. Leg 132 projects forwardly from rear cross support 75 with inwardly extending leg 135 being telescopically and slideably mounted within a hollow, rectangular, tubular support 136 having a cross-sectional configuration identical to the cross-sectional configuration of the rear cross support 75. Thus, the arrangement is such that the rearmost inwardly projecting leg 134 and the front inwardly projecting leg 135 on the U-shaped support member 131 can be slid transversely into and/or out of respective ones of the rear cross support 75 and the hollow, rectangular, tubular support 136 to any desired degree, enabling positioning of the longitudinally extending horizontal leg 132 on the U-shaped support member 131 at any pre-selected distance from the centerline of the trailer 51. Once properly positioned, the legs 134, 135 are rigidly, yet releaseably, locked to respective ones of the rear cross support 75 and the hollow, rectangular, tubular support 136 by a plurality of set screws 138.

Figure 24:
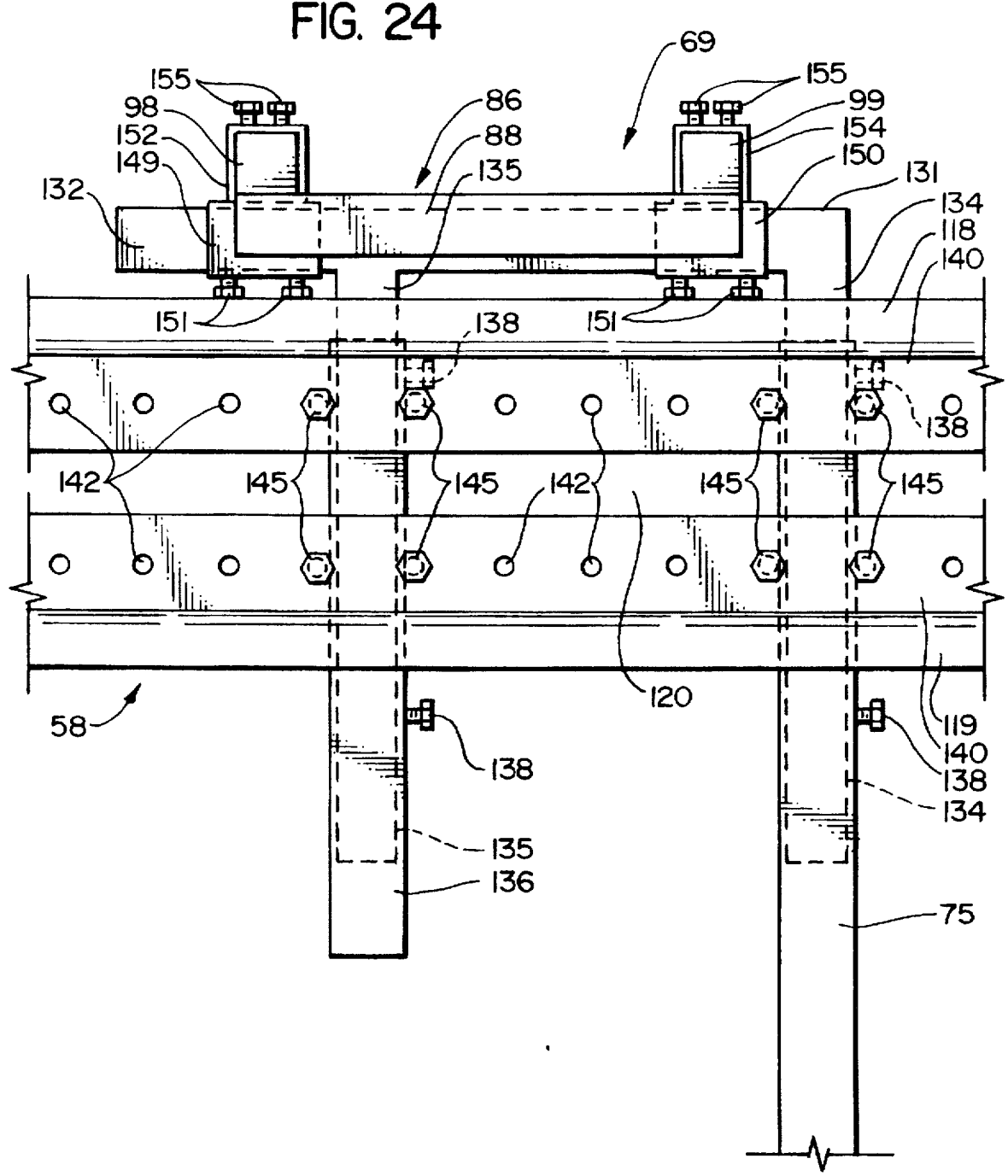

In order to adjustably secure the right C-shaped track 58 and its left and right L-shaped track members 118, 119 to the foregoing support structure, each of the L-shaped track members 118, 119 includes a vertical leg 139 (as best shown in FIG. 22) terminating at its lowermost end in a right angular horizontal leg 140 directed inwardly towards, but terminating short of, a longitudinal centerline passing through the C-shaped track 58. Thus, the horizontal legs 140 at the bases of the two vertical legs 139 lie in a common horizontal plane and are spaced apart to define the longitudinally extending slot 120 between the L-shaped track members 118, 119. If desired, the upper ends of the vertical legs 139 on the L-shaped track members 118, 119 may be bent outwardly and downwardly in opposite directions through an angle on the order of approximately 135° as indicated at 141 in FIG. 22. Finally, and as best shown in FIGS. 17 and 24, the horizontal legs 140 of both the right and the left L-shaped track members 118, 119 are each provided with a plurality of through holes 142 extending along the longitudinal centerline of each horizontal leg with the holes preferably being spaced apart on approximately two and one-half inch (2½") centers.

In assembly, each of the right and left L-shaped track members 118, 119 is mounted on a pair of flat horizontal plates 144 which are in face-to-face contact with the bottom surface of the horizontal leg 140 and which are provided with through holes (not shown) registerable with the through holes 142 formed in the horizontal legs 140 of the track members 118, 119. The track members 118, 119 and respective ones of the flat plates 144 are positioned on both the rear cross support 75 and the hollow, rectangular, tubular support 136, with the vertical through holes 142 on the horizontal legs 140 being located immediately aft and immediately forward of both the rear cross support 75 and the hollow, rectangular, tubular support 136; and, pairs of bolts 145 are passed downwardly through respective ones of the holes 142 in the legs 140 (and the registering holes, not shown, in the plates 144) immediately aft and immediately forward of the rear cross support 75 and the rectangular, tubular support 136. The lower ends of the bolts 145 are passed through holes (not shown) formed in a second pair of flat plates 146 respectively positioned immediately below each of the rear cross support 75 and the hollow, rectangular, tubular support 136; and, the entire assembly is then clamped tightly together in any desired position by threading nuts 148 on the lower ends of the bolts 145 and tightening the bolt/nut combinations 145/148 so as to securely clamp the horizontal legs 140 of the right and left L-shaped track members 118, 119 defining the right C-shaped track 58 to both the rear cross support 75 and the hollow, rectangular, tubular support 136 which are securely clamped between the upper and lower flat plates 144, 146.

In use, the provision of multiple holes 142 spaced longitudinally along the horizontal legs 140 of the right and left L-shaped track members 118, 119 enables the rear cross support 75 and the hollow, rectangular, tubular support 136 to be adjusted either forwardly or rearwardly with respect to the L-shaped track members in coarse adjustments of approximately two and one-half inches (2½"). When the rear cross support 75 is properly positioned in a desired fore/aft location, the bolt/nut combinations 145/148 are loosely assembled; the left L-shaped track member 119 is positioned on the rear cross support 75 at any desired distance from the longitudinal centerline of the trailer 51 corresponding to one-half (½) the width of the wheelbase for the vehicle 61 (FIG. 1) to be transported; the right L-shaped track member 118 is positioned on the rear cross support 75 at a desired position spaced laterally from, and outboard of, the left L-shaped track member 119 by a distance suitable to accommodate the right wheels 64, 66 (FIG. 1) of the vehicle 61; and, the bolt/nut combinations 145/148 are tightened to rigidly clamp the right C-shaped track 58 defined by the right and left L-shaped track members 118, 119 to the rear cross support 75 and to the parallel hollow, rectangular, tubular support 136 at the desired location.

Thus, those skilled in the art will appreciate that the right and left L-shaped track members 118, 119 can be readily adjusted laterally with respect to one another and with respect to the longitudinal centerline of the trailer 51 to accommodate vehicles 61 having any specific wheelbase width and any size tire. At the same time, the rear cross support 75 can be adjusted in a fore/aft direction relative to the right C-shaped track 58 so as to accommodate vehicles 61 having different length wheelbases while insuring that the right rear latch assembly 69 is properly located outboard of the vehicle's right rear wheel 66 when the vehicle is fully loaded on the trailer 51 in its forwardmost position.

In order to permit adjustment of the right rear latch assembly 69, a pair of tubular, sleeve-like, support elements 149, 150 are slideably mounted on the longitudinally extending horizontal leg 132 of the U-shaped support member 131 in spaced apart relation; and, are arranged to be releaseably, yet securely, locked thereon by means of set screws 151, as best shown by reference to FIGS. 21 through 24 conjointly. Each of the horizontally oriented sleeve-like support elements 149, 150 has welded or otherwise permanently and rigidly affixed thereto a vertically oriented, hollow, rectangular, tubular sleeve 152, 154, respectively, dimensioned to telescopically receive the lower ends of respective ones of the front and rear vertical support posts 98, 99 on the right rear latch assembly 69 in snug-fitting, slideable relationship thereto; and, set screws 155 are provided for rigidly securing the front and rear vertical support posts 98, 99 and respective ones of the vertically oriented tubular sleeves 152, 154 at any desired vertical position suitable for insuring that the longitudinally extending slot 95 defined by the co-planar flanges 90, 94 on the box-shaped latch bracket 86 associated with the right rear latch assembly 69 is properly aligned with the laterally projecting stub shaft 82 on the right rear wheel latch flange 76 mounted on the right rear wheel 66 of the vehicle 61 to be transported.

Thus, the arrangement is such that the operator will adjust the right and left C-shaped tracks 56, 58 on the frame and rear cross support 75 by positioning the tracks 56, 58 in the proper position to accommodate the width of the wheelbase on the vehicle 61 to be transported and in a desired rough fore/aft position (dependent upon which pair of adjacent holes 142 on approximately two and one-half inch (2½") centers in the horizontal legs 140 of the right and left L-shaped track members 118, 119 are selected); and, the bolt/nut combinations 145/148 are then tightened to rigidly secure the left and right C-shaped tracks 56, 58 to the front and rear cross supports 74, 75. The set screws 138 used to secure the legs 134, 135 on the U-shaped support member 131 to respective ones of the rear cross member 75 and its associated parallel, hollow, rectangular, tubular support 136 are then loosened; and, the U-shaped support member 131 is shifted laterally—either inboard or outboard—to a position where the longitudinally extending gap 95 in the box-shaped latch bracket 86 is properly aligned in a longitudinally extending fore/aft direction with the wheel latch flange 76 on the right rear wheel 66 of the vehicle. The set screws 138 are then tightened to locate the U-shaped support member 131 in the desired fixed position.

The set screws 155 are then loosened so as to permit the front and rear vertical support posts 98, 99 on the right rear latch assembly 69 to be shifted vertically—either up or down—so as to accurately align, in a vertical direction, the longitudinally extending gap 95 in the box-shaped latch bracket 86 with the wheel latch flange 76 on the right rear wheel 66 of the vehicle 61, at which point the set screws 155 are tightened to securely clamp the right rear latch assembly in the desired vertical position.

Finally, the set screws 151 used to secure the right rear latch assembly 69 to the U-shaped support member 131 in a desired fore/aft position are loosened; the latch assembly 69 is shifted longitudinally in either a forward or a rearward direction so as to provide fine adjustment of the right rear latch assembly 69 relative to the vehicle's right rear wheel latch flange 76 when the vehicle 61 is fully loaded on the trailer 51 in its forwardmost position; and, the set screws 151 are tightened to securely lock the right rear latch assembly 69 to the trailer 51 in the desired position determined by the wheelbase of the vehicle 61 being transported.

Of course, those skilled in the art will appreciate that essentially the same adjustments can, and will, be made to the left front latch assembly 68 and its attachment to the trailer 51 adjacent the left extremity of the front cross support 74. Thus, the arrangement is such that the left and right C-shaped tracks 56, 58 can be adjusted laterally and in a fore/aft direction, as well as in width, to accommodate vehicles 61 having a wide range of different sized wheelbases in terms of length and/or width, as well as to accommodate virtually any size tire. The left front and right rear latch assemblies 68, 69 can similarly be adjusted in fore/aft directions as well as vertically, and locked into position to accommodate vehicles 61 having virtually any wheelbase irrespective of length and/or width, and irrespective of the diameter of the wheel and the size of the tire.

Accordingly, those skilled in the art will appreciate that there have herein been described latch assemblies 68, 69 that can be used with virtually any type of flatbed vehicle carrier 51 irrespective of whether it employs, or does not employ, a tiltable bed; and, additionally, which can be used with virtually any four-wheeled vehicle 61 to be transported. The latch assemblies 68, 69 operate completely automatically to positively and securely latch the vehicle 61 to the vehicle carrier 51 without operator intervention and without the need for separate and manually applied tethers and/or other latching mechanisms. Indeed, the latch assemblies 68, 69 of the present invention completely eliminate the need for operator intervention and for separate tie down mechanisms and/or chocks to tether the vehicle 61 being transported to the vehicle carrier 51 during an on-loading operation. During off-loading of the vehicle 61 from the carrier 51, the operator need merely shift the latch actuating handle 108 (FIGS. 8,10 and 12 through 16) once through an angle of approximately 90° to unlatch the vehicle 61; and, thereafter, resetting of the safety latches 100,101 is completely automatic. Indeed, the single manual operation involving shifting of the latch actuating handle by the operator to move the safety latches 100, 101 against the biasing force of the springs 111 to the unlatched state can, where desired, be replaced with an automatic unlatching mechanism of any conventional construction wherein the safety latches 100, 101 are shifted to the unlatched state using hydraulic, pneumatic, electric or electro/mechanical actuators of the type well know to persons skilled in the art.

Those skilled in the art will further appreciate that, in its broadest aspects, the present invention enables effective loading of a vehicle 61 on a vehicle carrier 51 in a precise, predetermined, fixed yet releasable, immovable position on a repetitive basis even absent the provision of spring-biased safety latches 100, 101. To this end, it will be appreciated that the vehicle-mounted wheel latch flange 76 actually comprises a first retainer element projecting from the vehicle 61, while one of the latch assemblies—e.g., the left front latch assembly 68—actually comprises a retainer assembly having a second retainer element (e.g., the box-shaped bracket 86), wherein one of the first and second retainer elements comprises a male element and the other comprises a complementally shaped female element, enabling the male and female elements to interengage and coact to preclude forward, vertical and/or lateral movement of the vehicle 61 relative to the vehicle carrier 51. In such an arrangement, the forward ends of the upstanding legs 139 (FIG. 122) of the inboard and outboard L-shaped rails 118, 119 defining the left channel-shaped track 56 serve as a guide mechanism which insures alignment and registration of the male and female retainer elements during a vehicle on-loading operation. Once fully loaded, the vehicle 61 can be precluded from rearward movement in any desired manner (not shown) —for example, by inserting a bolt, rod or the like laterally through the female retainer element aft of the male retainer element, with any suitable ratchet mechanism, with a wheel chock placed aft of the retained wheel, or by setting the vehicle's emergency brake.

Moreover, while the exemplary wheel latch flange 76 has been shown as including a circular groove 84 for receiving the co-planar flanges 90, 94 on the box-like latch bracket 86, those skilled in the art will appreciate that other arrangements are equally effective. For example, the stub shaft 82 on the wheel latch flange 76 could have either a groove 84 with a reduced base diameter as shown or, alternatively, the entire length of the stub shaft inboard of the groove could have the same reduced base diameter while an enlarged flange or protuberance is provided on the outboard end of the stub shaft 82 with a diameter greater than the height of the gap 95 as shown in the drawings.

Finally, those skilled in the art will appreciate that wheels and wheel rims differ widely from vehicle to vehicle; and, in some instances there may be an existing axially projecting shaft on the wheel, while in other instances the wheels may be devoid of lugs and lug nuts. In such instances, it is within the scope of the invention to shape the base plate 78 of the wheel latch flange 76 so that it is complemental to the outer face of the wheel; and, to apply the wheel latch flange 76 to the wheel with conventional fasteners, welding, or the like.

I claim:

1. Apparatus for releasably precluding movement of a motorized wheeled vehicle of the type having a suspension system including wheel assemblies mounted on opposite ends of a vehicle axle relative to a vehicle carrier when fully loaded thereon, said apparatus comprising, in combination:
   a) a vehicle carrier for supporting and transporting a motorized wheeled vehicle;
   b) a first retainer element mounted on at least one of the wheel assemblies on the motorized wheeled vehicle and projecting laterally outward therefrom;
   c) at least one retainer assembly fixedly mounted on said vehicle carrier and positioned thereon so as to be located outboard of each wheel assembly upon which a respective said first retainer element is mounted, each said at least one retainer assembly including a second retainer element;
   d) one of said first and second retainer elements comprising a male element and the other of said first and second retainer elements comprising a female element shaped complementally with respect to said male element and adapted to receive and captively retain said male element; and,
   e) a releasable device for precluding rearward movement of the motorized wheeled vehicle relative to each said retainer assembly and said vehicle carrier;

whereby, when the motorized wheeled vehicle is fully loaded on said vehicle carrier and said first and second retainer elements are inter-engaged and coacting, the motorized wheeled vehicle is fixedly, but releasably, secured to and captively retained on said vehicle carrier through the vehicle's suspension system.

2. Apparatus as set forth in claim 1 further including a guide mechanism mounted on said vehicle carrier for engaging at least one of said wheel assemblies on the motorized wheeled vehicle as the vehicle is on-loaded onto said vehicle carrier for guiding the vehicle with said laterally projecting first retainer element towards and into registration with said second retainer element on said at least one retainer assembly, with said male and female elements interengaging and coacting so as to preclude forward, vertical and/or lateral movement of the vehicle relative to said at least one retainer assembly and, therefore, relative to said vehicle carrier on which said at least one retainer assembly is mounted.

3. Apparatus as set forth in claim 1 wherein said first retainer element includes a flange having an axially extending laterally projecting stub shaft formed thereon, said flange adapted to be secured to, and outboard of, at least one of the motorized wheeled vehicle's wheel assemblies.

4. Apparatus as set forth in claim 3 wherein each said at least one retainer assembly includes a longitudinally extending box-like bracket defining a forward stop and said second retainer element.

5. Apparatus as set forth in claim 1 wherein each said at least one retainer assembly includes a longitudinally extending box-like bracket defining a forward stop and said second retainer element.

6. Apparatus as set forth in claim 1 wherein said releasable device comprises at least one spring-based latch plate pivotally mounted in said retainer assembly for precluding rearward movement of said first retainer element relative to said retainer assembly.

7. Apparatus as set forth in claim 1 wherein at least an additional said first retainer element is provided; said first retainer elements being respectively mounted on, and outboard of diagonally opposite ones of said wheel assemblies or the front and rear axles of the motorized vehicle, and at least two said retainer assemblies are provided which are respectively mounted on said vehicle carrier and positioned outboard of said diagonally opposite ones of said wheel assemblies when the vehicle is fully loaded on said vehicle carrier.

8. Apparatus for releasably precluding movement of a motorized wheeled vehicle of the type having a suspension system including wheel assemblies mounted on opposite ends of a vehicle axle relative to a vehicle carrier when fully loaded thereon, said apparatus comprising, in combination;
   a) A vehicle carrier for supporting and transporting a motorized wheeled vehicle;
   b) a first retainer element mounted on at least one of the wheel assemblies on the motorized wheeled vehicle and projecting laterally outward therefrom, said first retainer element including: i) a flange; ii) an axially extending laterally projecting stub shaft formed on said flange; and iii, an enlarged protuberance on an outboard projecting end of said stub shaft, said flange adapted to be secured to, and outboard of, at least one of the motorized wheeled vehicle's wheel assemblies;
   c) at least one retainer assembly fixedly mounted on said vehicle carrier and positioned thereon so as to be located outboard of each wheel assembly upon which a respective said first retainer element is mounted, each said at least one retainer assembly including a longitudinally extending box-like bracket defining: i) a forward stop; and ii) a second retainer element comprising a pair of co-planer spaced apart longitudinally extending flanges with said flanges adapted to be positioned intermediate said enlarged protuberance on said stub shaft and said flange on said first retainer element during interengagement and coaction thereof; and, d) a releasable device for precluding rearward movement of the motorized vehicle relative to each said retainer assembly and said vehicle carrier;

whereby, when the motorized wheeled vehicle is fully loaded on said vehicle carrier and said enlarged protuberance on aid first retainer element is inter-engaged and coacting with said pair of co-planer flanges defining said second retainer element, the motorized wheeled vehicle is fixedly, but releasably, secured to and captively retained on said vehicle carrier through the vehicle's suspension system.

9. Apparatus as set froth in claim 8 further including a guide mechanism mounted on said vehicle carrier for engaging at least one of said wheel assemblies on the motorized wheeled vehicle as the vehicle is on-loaded onto said vehicle carrier for guiding the vehicle with said laterally projecting first retainer element towards and into registration with said second retainer element on said at least one retainer assembly, with said first and second retainer elements inter-engaging and coacting so as to preclude forward, vertical and/or lateral movement of the vehicle relative to said at least one retainer assembly and, therefore, relative to said vehicle carrier on which said at least one retainer assembly is mounted.

10. Apparatus as set forth in claim 8 wherein said enlarged protuberance is defined by a circular groove formed in said stub shaft and said co-planer spaced apart flanges are received within said groove.

11. Apparatus as set forth in claim 8 wherein said releasable device comprises at least one spring-biased latch plate pivotally mounted in said retainer assembly for precluding rearward movement of said first retainer element relative to said retainer assembly.

12. Apparatus as set forth in claim 8 wherein at least an additional first retainer element is provided; said first, retainer elements being on, and outboard of, diagonally opposite ones of said wheel assemblies an the front and rear axles of the motorized vehicle, and at least two said retainer assemblies are provided which are respectively mounted on said vehicle carrier and positioned outboard of said diagonally opposite ones of said wheel assemblies when the vehicle is fully loaded on said vehicle carrier.

* * * * *